US012447982B2

(12) United States Patent
Babaali

(10) Patent No.: US 12,447,982 B2
(45) Date of Patent: Oct. 21, 2025

(54) DETERMINISTIC SIMULATION OF DISCRETE BLOCK DIAGRAMS FOR VEHICULAR CONTROL SYSTEM

(71) Applicant: Magna Electronics Inc., Auburn Hills, MI (US)

(72) Inventor: Mohamed Babaali, Shrewsbury, MA (US)

(73) Assignee: Magna Electronics Inc., Auburn Hills, MI (US)

( * ) Notice: Subject to any disclaimer, the term of this patent is extended or adjusted under 35 U.S.C. 154(b) by 351 days.

(21) Appl. No.: 18/337,540

(22) Filed: Jun. 20, 2023

(65) Prior Publication Data

US 2023/0415759 A1    Dec. 28, 2023

Related U.S. Application Data

(60) Provisional application No. 63/366,925, filed on Jun. 24, 2022.

(51) Int. Cl.
*B60W 50/04*    (2006.01)

(52) U.S. Cl.
CPC ....... *B60W 50/04* (2013.01); *B60W 2050/041* (2013.01)

(58) Field of Classification Search
CPC . B60W 50/04; B60W 2050/041; G06F 30/20; G06F 30/15; G06F 11/3688; G06F 11/3698; G07C 5/0808
See application file for complete search history.

(56) References Cited

U.S. PATENT DOCUMENTS

| | | | |
|---|---|---|---|
| 5,550,677 A | 8/1996 | Schofield et al. | |
| 5,670,935 A | 9/1997 | Schofield et al. | |
| 5,949,331 A | 9/1999 | Schofield et al. | |
| 7,038,577 B2 | 5/2006 | Pawlicki et al. | |
| 7,720,580 B2 | 5/2010 | Higgins-Luthman | |
| 7,855,755 B2 | 12/2010 | Weller et al. | |
| 11,511,762 B2 | 11/2022 | Huang et al. | |
| 2005/0177353 A1* | 8/2005 | Slater | G06F 30/20 703/6 |
| 2019/0359222 A1 | 11/2019 | Huang et al. | |
| 2020/0353949 A1 | 11/2020 | Huang et al. | |
| 2021/0061303 A1 | 3/2021 | Huang et al. | |
| 2021/0339767 A1 | 11/2021 | Karaman et al. | |
| 2021/0341941 A1 | 11/2021 | Karaman et al. | |
| 2023/0410573 A1 | 12/2023 | Babaali | |

FOREIGN PATENT DOCUMENTS

| | | | | |
|---|---|---|---|---|
| CN | 108230817 A | * | 6/2018 | ............... G09B 9/04 |
| CN | 111177893 A | * | 5/2020 | |
| WO | WO-2010104135 A1 | * | 9/2010 | ............. G05B 17/02 |

\* cited by examiner

*Primary Examiner* — Mary Cheung
(74) *Attorney, Agent, or Firm* — HONIGMAN LLP

(57) ABSTRACT

A method for testing a vehicular control system includes receiving, at a simulator, a discrete diagram identifying a plurality of tasks to be simulated and connections between the plurality of tasks, and receiving, at the simulator, a requested determinism level selected at a user device from a plurality of determinism levels. An optimal execution policy based on the simulator, the discrete diagram and the requested determinism level is selected from a plurality of execution policies. The plurality of tasks are simulated, by the simulator, using the selected optimal execution policy to simulate operation of the vehicular control system on a vehicle.

22 Claims, 34 Drawing Sheets

DETERMINISTIC SIMULATION OF DISCRETE BLOCK DIAGRAMS FOR VEHICULAR CONTROL SYSTEM

CROSS REFERENCE TO RELATED APPLICATION

The present application claims the filing benefits of U.S. provisional application Ser. No. 63/366,925, filed Jun. 24, 2022, which is hereby incorporated herein by reference in its entirety.

FIELD OF THE INVENTION

The present invention relates generally to a vehicular control system or driving assist system for a vehicle and, more particularly, to testing of a vehicular control system or driving assist system.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A method for testing a vehicular control system includes receiving, at a simulator, a discrete diagram including (i) a plurality of nodes and (ii) a plurality of edges. Each node of the plurality of nodes represents a task of the vehicular control system to be simulated. Each edge of the plurality of edges connects two respective nodes of the plurality of nodes and represents data transfer between the two respective nodes. The method includes receiving, at the simulator, a requested determinism level selected at a user device from a plurality of determinism levels and selecting, from a plurality of execution policies, an execution policy based on (i) the simulator, (ii) the discrete diagram (iii) and the received requested determinism level. The method includes simulating, by the simulator, each task represented by the plurality of nodes using the selected execution policy to simulate operation of the vehicular control system on a vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or vehicular control system operates to capture sensor data (e.g., images) exterior of the vehicle and may process the captured sensor data to, for example, display images and to detect objects at or near the vehicle and in the predicted path of the vehicle, such as to assist a driver of the vehicle in maneuvering the vehicle in a rearward direction. The vision system may include a data processor or processing system that is operable to receive sensor data from one or more sensors and provide an output to a display device for displaying images representative of the captured sensor data.

Figure 1:
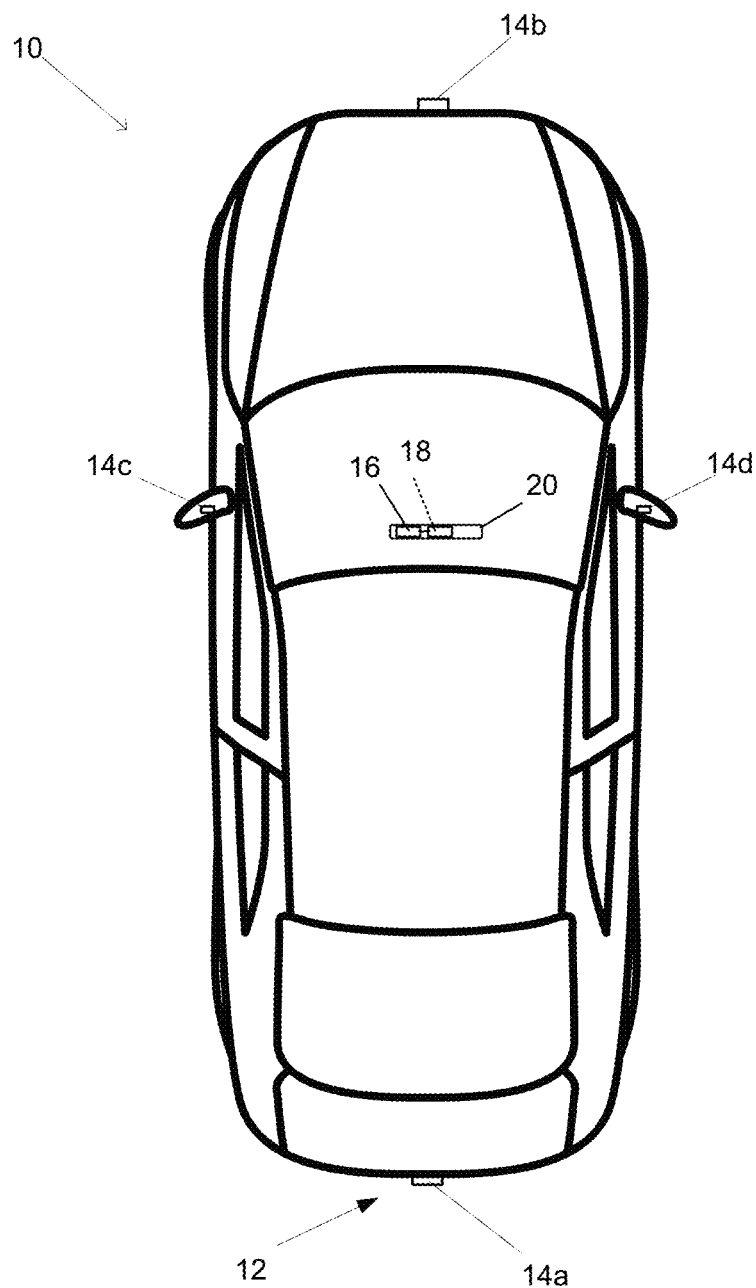
FIG. 1 is a plan view of a vehicle with a vision system that incorporates cameras.

Referring now to the drawings and the illustrative embodiments depicted therein, a vehicle 10 includes an imaging system or control system 12 that includes at least one exterior viewing sensor, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The control system 12 includes a control or electronic control unit (ECU) 18 having electronic circuitry and associated software, with the electronic circuitry including a data processor or image processor that is operable to process image data captured by the sensors (e.g., cameras, radar, lidar, etc.) whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Modern vehicles, such as partially or fully autonomous vehicles, include many complicated hardware and software systems, such as any number of driver assistance systems and vision systems (FIG. 1). These systems (such as an object detection system) require extensive testing and simulation for development and maintenance purposes. However, simulations are frequently not repeatable (i.e., the simulation does not produce the same outputs each time). This can cause problems with debugging, testing, and/or investigating issues. In some scenarios, reproducing elusive defects (i.e., "bugs") is difficult. This is a result of nondeterminism in the simulation environment. There are several sources of nondeterminism. For example, the sources of nondeterminism may include random sources (e.g., random number generators), communications (e.g., lost or reordered messages), concurrency, multiple processes/multithreading, and system time.

Some sources of nondeterminism are straightforward to account for. For example, random number generators may be seeded and communications may be designed to function deterministically. Other sources, such as multiple processes and system time are more difficult and/or tedious to account for. Implementations herein address nondeterminism that arises from system time and multiple processes. That is, applications using a system (e.g., a simulator) may execute provably deterministic even with system time and multiple processes.

Figure 2:
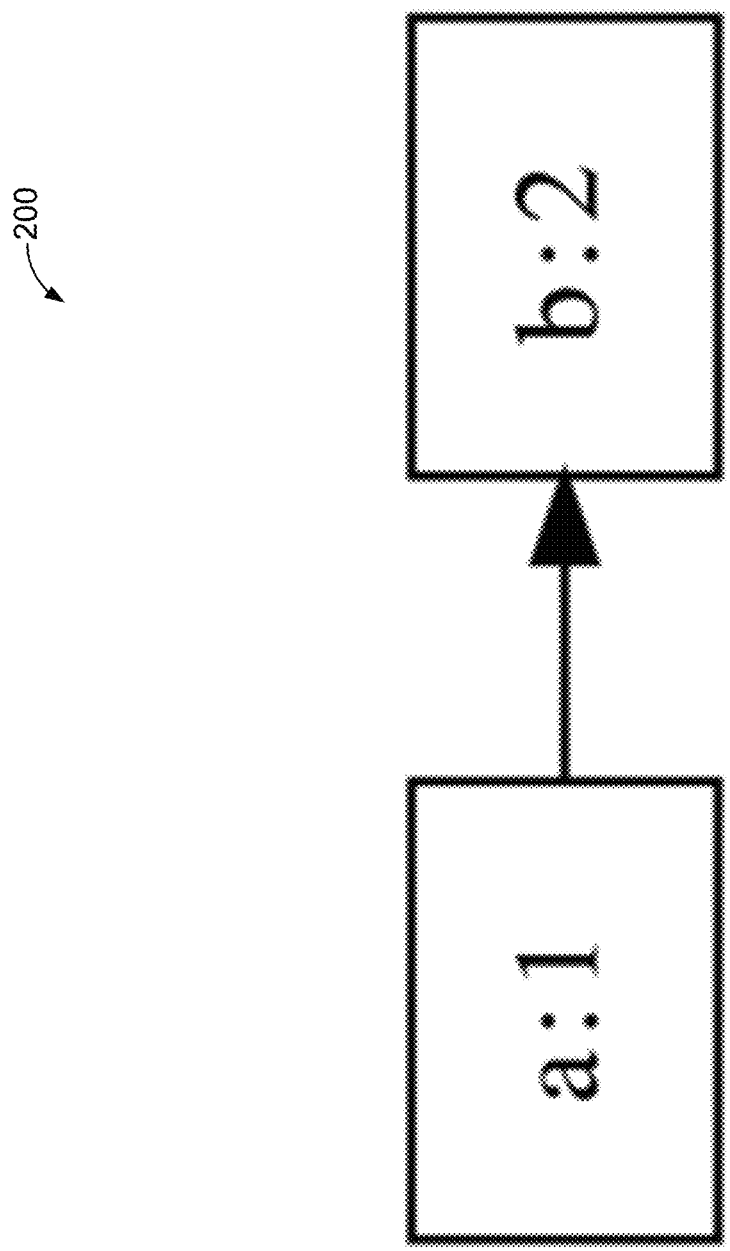
FIG. 2 is a schematic view of a discrete diagram.

As used herein, a discrete diagram is a diagram consisting of nodes that are connected by directed edges and equipped with a real number. As shown in FIG. 2, a discrete diagram 200 includes nodes that represent tasks (e.g., functors) that are executed at regular time intervals. The real number represents the period at which each task is executed. The unit may represent anything, as long as it is consistent across all blocks. An edge indicates that data transfer occurs between the adjacent nodes of the edge. These tasks have an internal state that persists from call to call (i.e., from time interval to the next time interval) and the first time interval always occurs at zero seconds. In the example of FIG. 2, the discrete diagram 200 is represented using a graph where node names (i.e., 'a' and 'b' in this example) are separated by a colon from the period (i.e., the real numbers of '1' and '2' in this example). Thus, in this example, a first node has a name of 'a' with a period of one second and a second node has a name of 'b' with a period of two seconds. Additionally, node b consumes data from node a.

Simulating a discrete diagram generally involves marshaling data between tasks, providing a way for each callback to query the current time, and running "ticks" (i.e., time intervals) in a certain order, such as serially or concurrently. Simulators have a number of desired behaviors. For example, it is useful for simulators to guarantee progression. Uniform progression is defined herein as when all ticks of a task are executed in order. Specifically, this simply means that if a task has a period of T, and therefore has ticks scheduled at times {0, T, 2T, 3T, . . . }, then each tick is executed in that order, and each tick must wait for the previous tick to finish executing before starting. Progression is often the most basic guarantee that a discrete diagram simulator can provide. Another guarantee that is desirable is causality. Generally, causality relates to each task operating on the most recent data possible, on each tick. Causality can be weak or strong. As used herein, strong causality is defined as that a particular task's tick at time t must wait for all ticks of all tasks feeding the particular task and for all times q such that q t to finish executing. In other words, every task waits for execution until everything feeding the respective task up to, and including the current time, has finished publishing. Weak causality, as used herein, denotes that a task's tick at time t must wait for all ticks of all tasks feeding the task and for all times q such that q<t to finish executing. In other words, every task waits until everything providing data to the task up to, but not necessarily including the current time, has finished publishing. While enforcing strong causality is not always possible, weak causality may always be enforced. Determinism, as used herein, refers to the concept that when two simulation runs of the same discrete diagram begin using the same initial conditions, the two simulation runs will always generate identical output logs. Implementations herein allow developers and testers to ensure a deterministic simulation environment.

Regarding the execution model of simulators, when running in real time, either in simulation or on the vehicle, task ticks (e.g., 1 s, 2 s, etc. for a 1 s period) are executed based on a real-time clock. In simulation, however, it is assumed that there is an entity (i.e., the simulator or daemon) that has tight control over when task ticks are executed. For example, the simulator can execute tasks in parallel or serially and can run the entire simulation at a varying speed independent of actual time (i.e., faster or slower than actual time). The simulator may ensure that all time queries during a particular tick, such as 3 s, return 3 s exactly regardless of when the time queries actually happen during the tick. That is, time is "frozen" until the next tick. In summary, the simulator may have considerable control over task execution such that the simulator may start a tick, detect when a tick has ended, and set the correct exact time for use during each tick.

Another crucial aspect of the execution model is data flow. In some examples, the subscriber/publisher message passing model is the main communication model between nodes. That is, there will be an edge from node a to node b when node a publishes to a channel that node b subscribes to. In terms of access, it may be assumed that all tasks subscribe to a channel by registering a callback that just pushes the input to a queue of finite size n. The queue will naturally be in a constant state of overflow after a certain amount of time, i.e., the queue will act as a circular buffer. Most tasks are only interested in one message, namely the most recent message, so n is usually equal to one. It may be assumed that the queue can be updated while a tick is executing, i.e., that the callback can be called during a tick. Similarly, tasks can also publish at any moment during a tick, and the message the tasks publish is then immediately sent to all subscribers and reaches the subscribers without delay.

Figure 3:
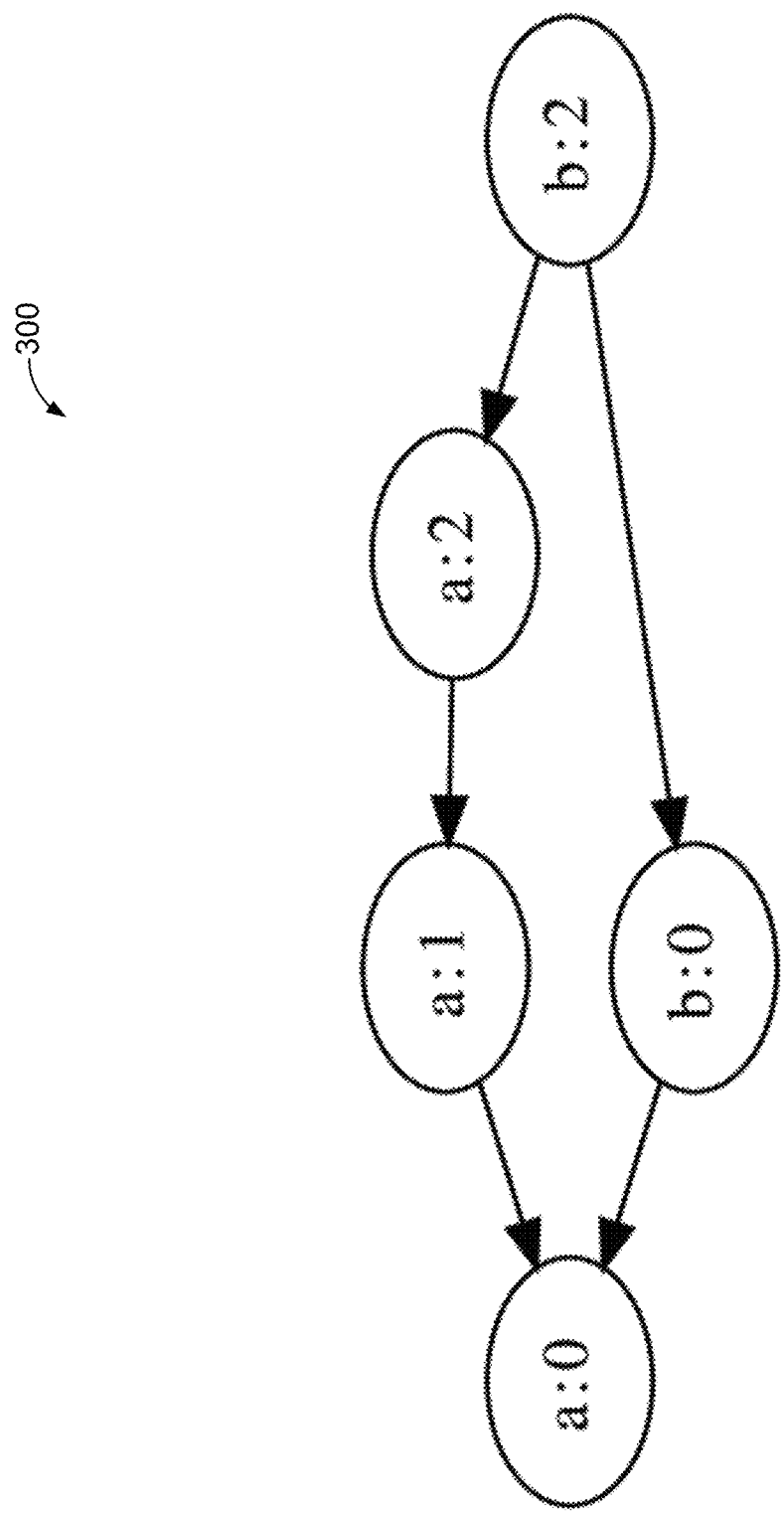
FIG. 3 is a schematic view of an execution graph.

It may be assumed that the only type of constraint used by the simulator to control task execution is the relative order of individual ticks. For example, in discrete diagram 200, the simulator may decide that the 2 s tick of node b must wait for the 1 s tick of node a to finish executing before starting. This may be represented with a directed edge from node b's tick to node a's tick (i.e., a dependency edge) in what may be referred to as an execution graph of the simulation algorithm. FIG. 3 includes an execution graph 300 of the nodes of the discrete diagram 200 (FIG. 2). In an execution graph, time advances from left to right. In examples here, ovals represent execution graphs (e.g., FIG. 3 and execution graph 300) while boxes represent discrete diagrams (e.g., FIG. 2 and discrete diagram 200). It is important to note that, according to the execution graph 300, the two ticks (a:1) and (b:0) may execute in parallel, at least partially, because there is no constraint involving them. There are other pairs, namely (a:2) and (b:0), that may also execute in parallel.

Execution graphs are usually unbounded assuming a simulation runs forever. However, they may be useful when executing a diagram in simulation. In these cases, however, only a finite portion of the graph is truly held in memory. This finite portion is usually the portion that holds the very next tick to execute for each task. In some implementations, the simulator maintains a waiter for each tick that is waiting its turn. Each waiter waits for all of the tick's dependent waiters to finish, launches the tick, then notifies the simulator, which deletes the waiter and creates a new waiter for the next tick.

Because individual relative execution order is the only primary concern, it is notable that enforcing execution graphs results in the fastest way to run a simulation conforming to a certain measure of quality (e.g., determinism). It is also notable that execution graphs must be acyclic. Otherwise, the graphs cannot be executed because of circular deadlock.

Figure 4:
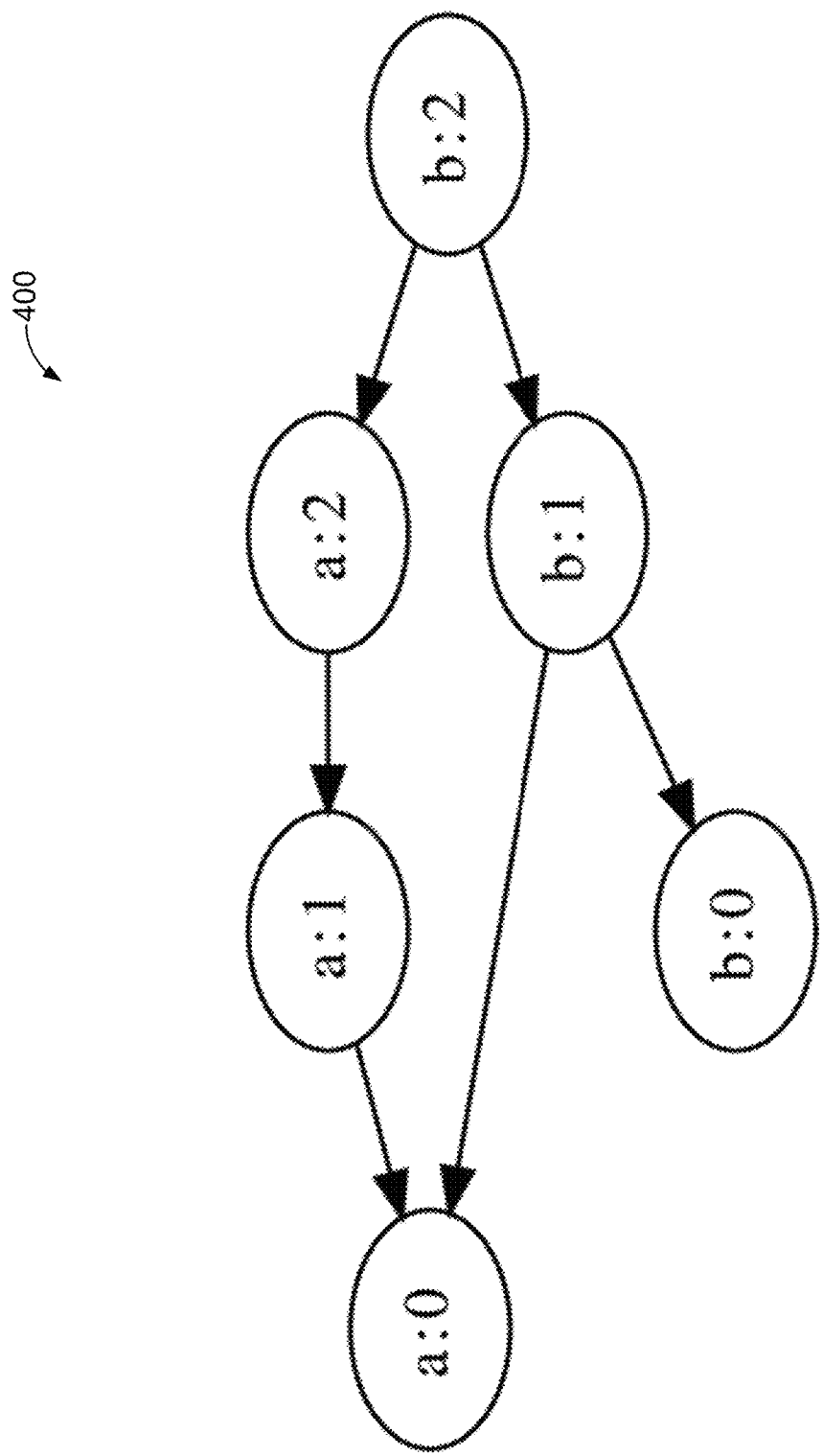
FIG. 4 is a schematic view of a plausible ad hoc graph.

It is also noted that execution graphs generally are created after the fact, because each execution is going to be different than the previous one. This results in an ad hoc graph. FIG. 4 illustrates a plausible ad hoc graph 400. Here, all of the previously described quality criteria may be violated in certain scenarios. For example, uniform progression is satisfied in the graph 400, but if a second execution where (b:1) takes sufficient time to execute such that (b:2) is skipped, the graph may instead violate uniform progression. Additionally, strong causality is violated in graph 400 because (b:1) should wait for (a:1) to execute to get the latest message from node a, but that does not occur. Moreover, determinism is not ensured because when executing the same simulation a second time, (b:1) may actually wait for (a:1) to have complete execution.

Figure 5:
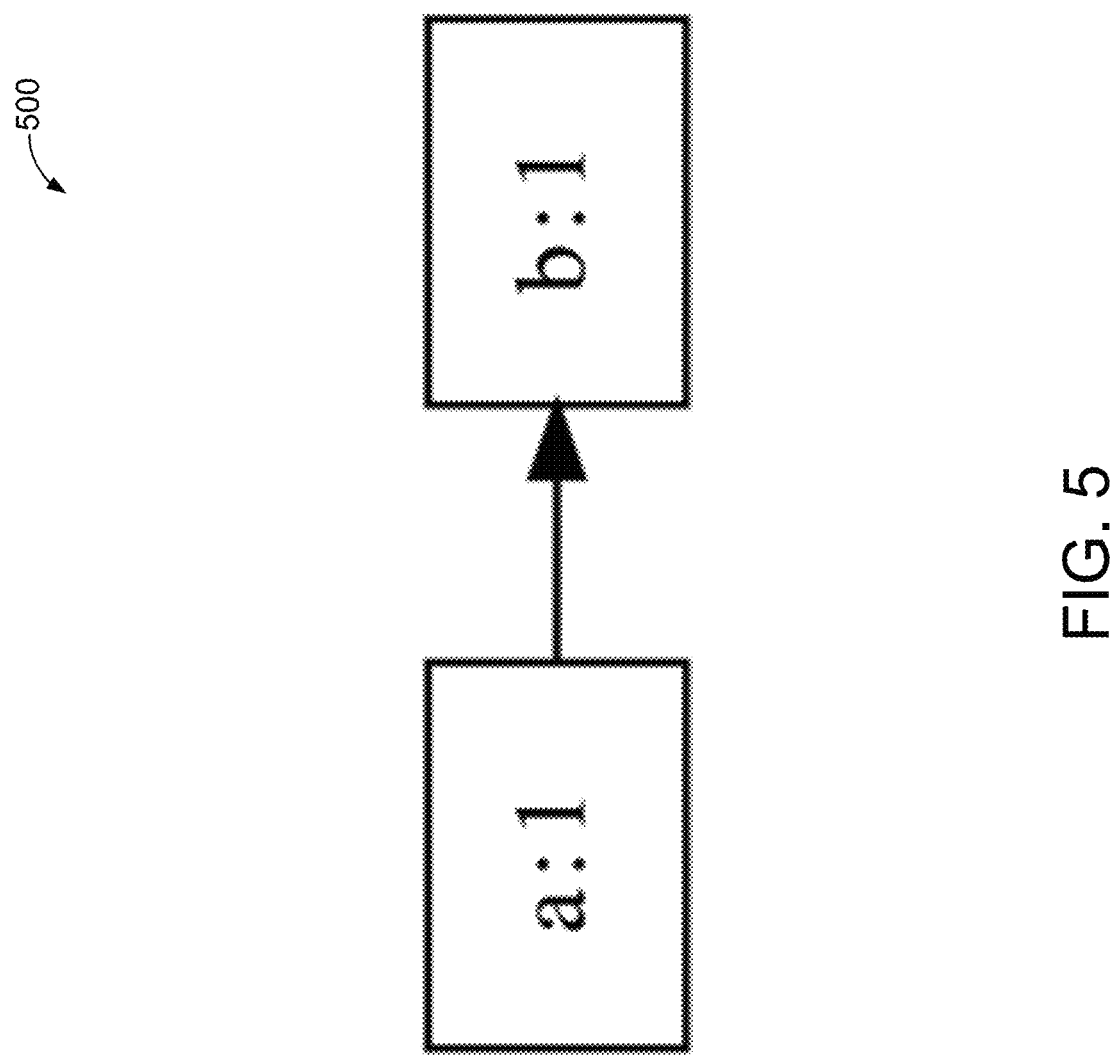
FIG. 5 is a schematic view of a discrete diagram with a single edge.
Figure 6:
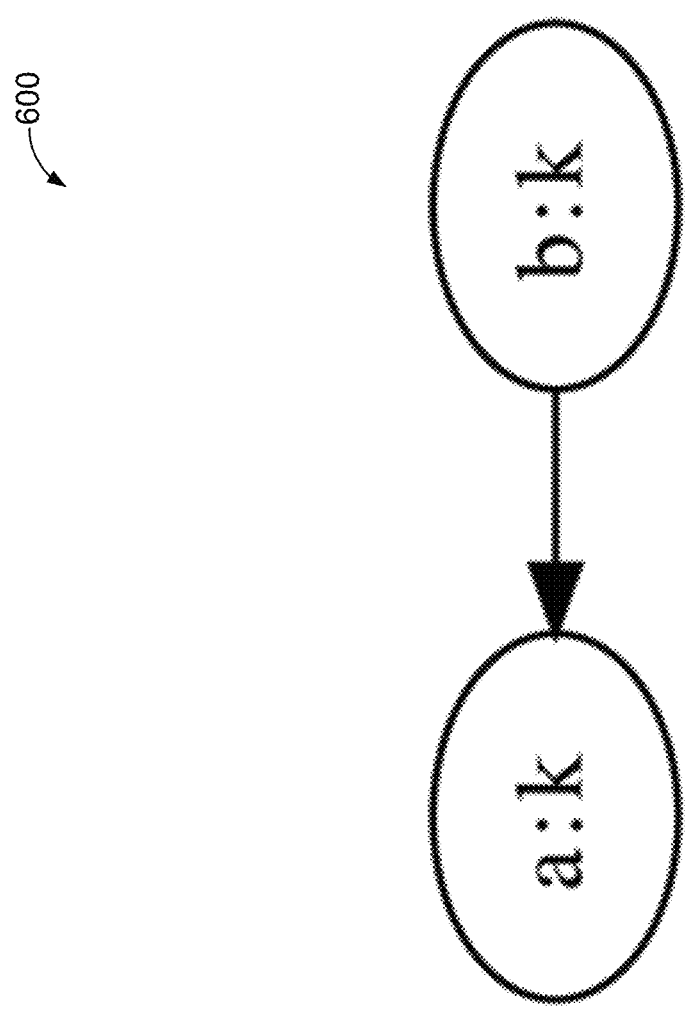
FIG. 6 is a schematic view of a closed interval generator of the discrete diagram of FIG. 5.
Figure 7:
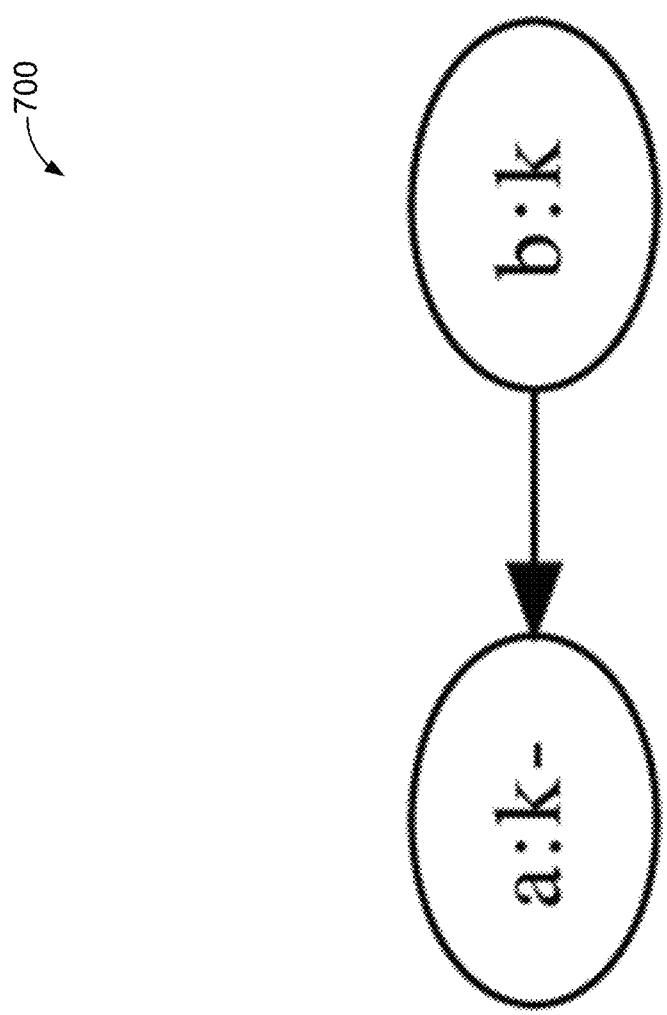
FIG. 7 is a schematic view of an open interval generator of the discrete diagram of FIG. 5.
Figure 8:
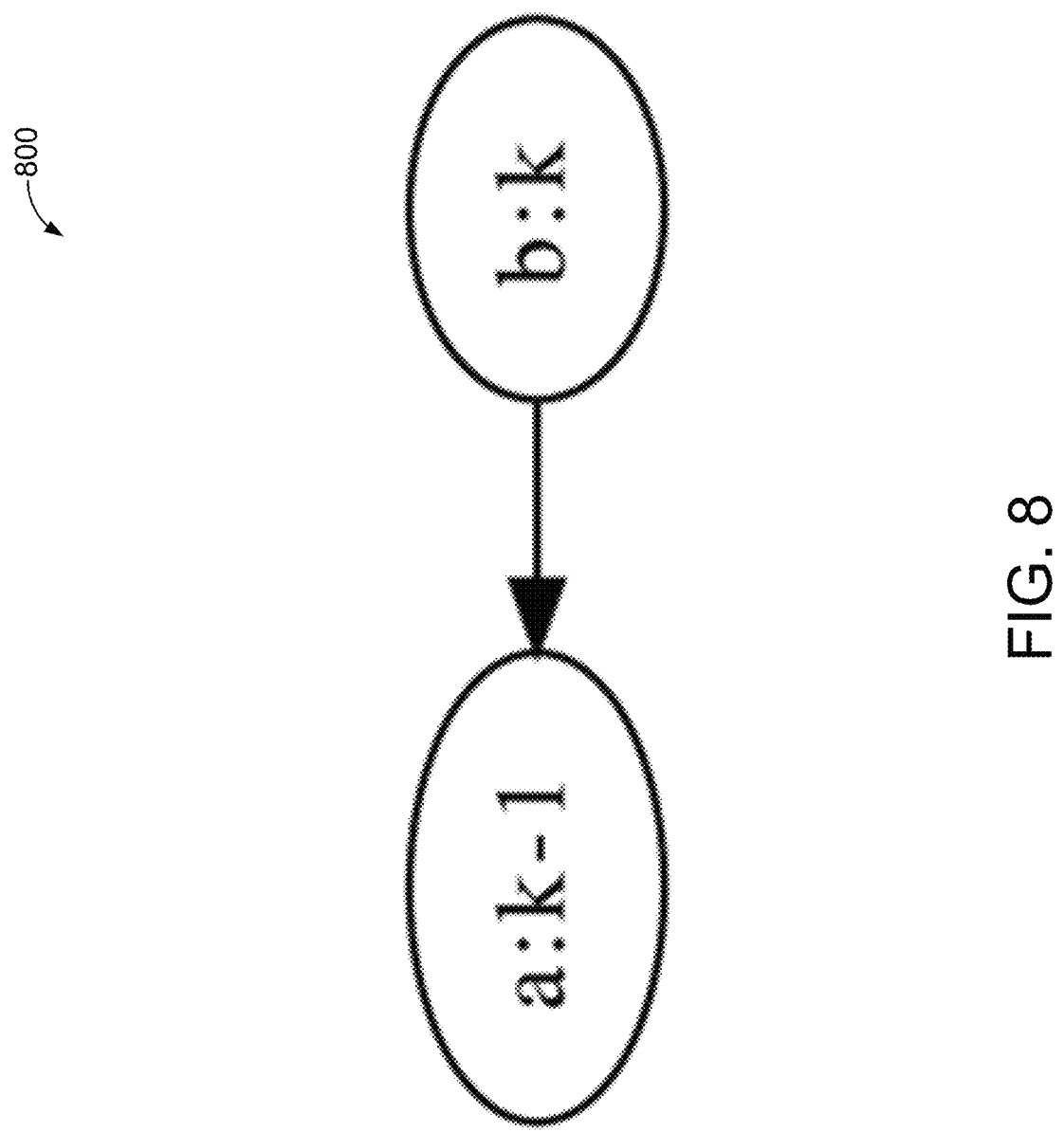
FIG. 8 is a schematic view of an explicit open interval generator of the discrete diagram of FIG. 5.

An execution policy defines a mapping that maps discrete block diagrams to execution graphs. Execution policies must be implementable with finite memory. An important class of such execution policies includes recursive policies, where every task's next tick only depends on all other tasks' ticks that immediately precede it. An execution policy may be described as a generator. A generator is defined herein as a mapping that maps every edge in the original discrete diagram to a sequence of edges in the execution graph. FIG. 5 includes a diagram 500 with a single edge. Here, a generator that adds an edge from every one of node b's ticks to the latest of node a's ticks that occurs before or at the same time as node b's tick (i.e., closed left interval) may be represented as graph 600 (FIG. 6) which illustrates a closed interval generator. FIG. 7 includes a graph 700 that instead illustrates a generator with an open interval. Here, the latest tick occurs strictly before node b's tick (indicated by the "-" at the right of the tick time). When frequencies are equal, FIG. 8 includes a graph 800 that more explicitly illustrates a generator with an open interval.

Figure 9:
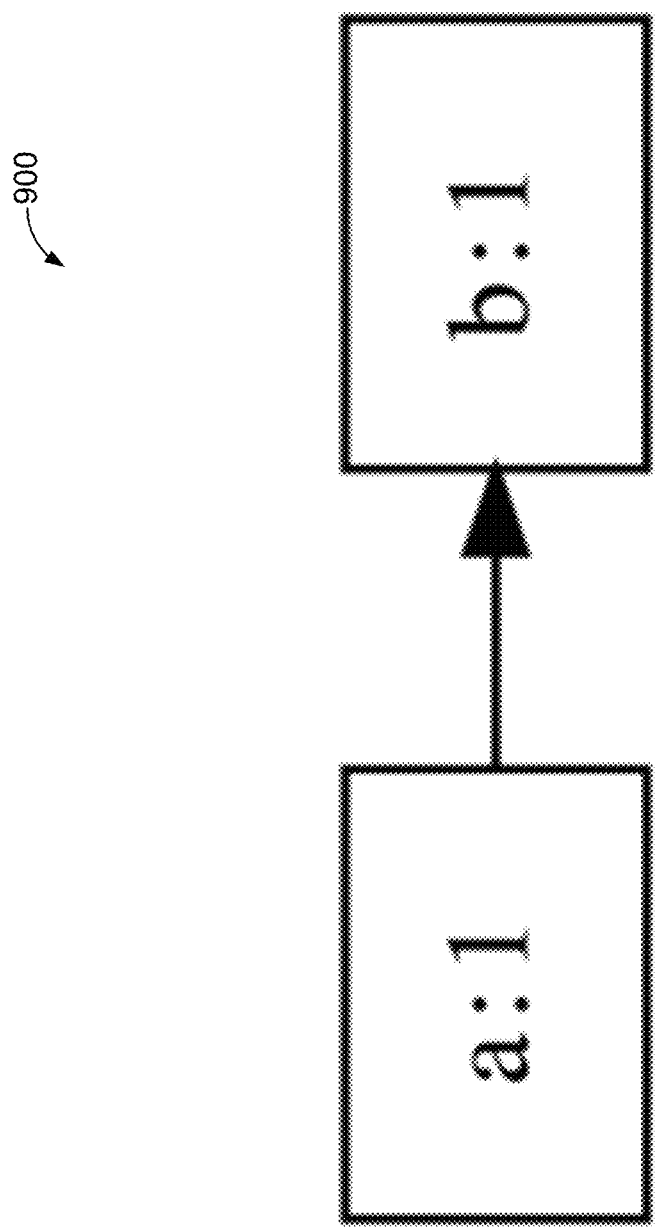
FIG. 9 is a schematic view of a discrete diagram.
Figure 10:
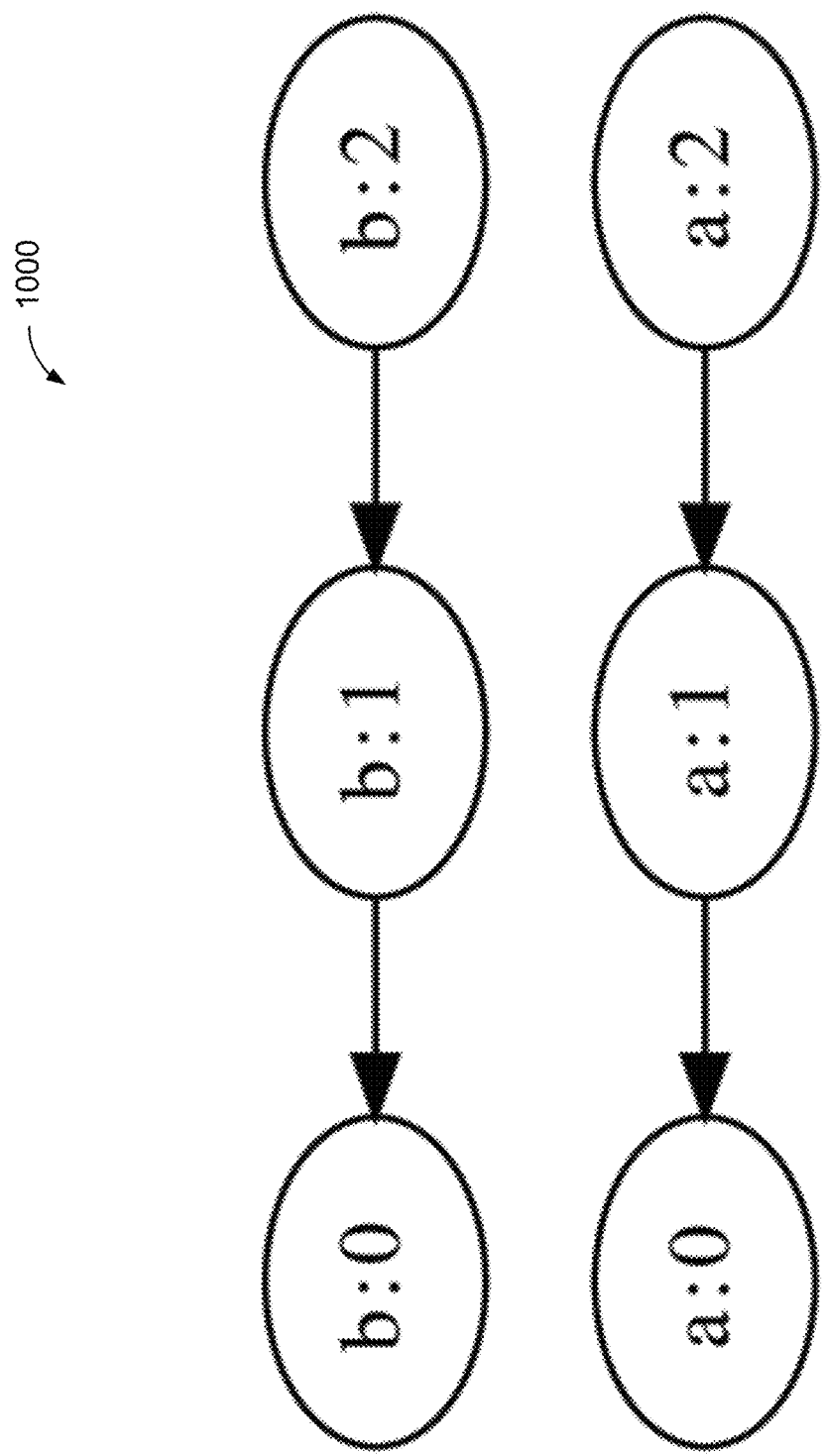
FIG. 10 is a schematic view of a progression policy of the discrete diagram of FIG. 9.

A uniform progression policy adds the minimum number of edges to guarantee progression. To accomplish this, implementations herein add an edge from (k+1)T to kT for each task, where T is each task's period. Assuming all periods are equal to 1 unit of time, FIG. 9 includes a simple diagram 900 while FIG. 10 includes an execution graph 1000 (FIG. 10) to time 2 for the diagram 900. When tasks are not communicating with each other, then this policy guarantees causality (both strong and weak) and determinism. If tasks do communicate with each other, then these guarantees cannot be made. For example, this policy does not require that node b wait for any of node a's messages to be published to execute any of its ticks, which violates the strong and weak causality requirements.

Figure 11:
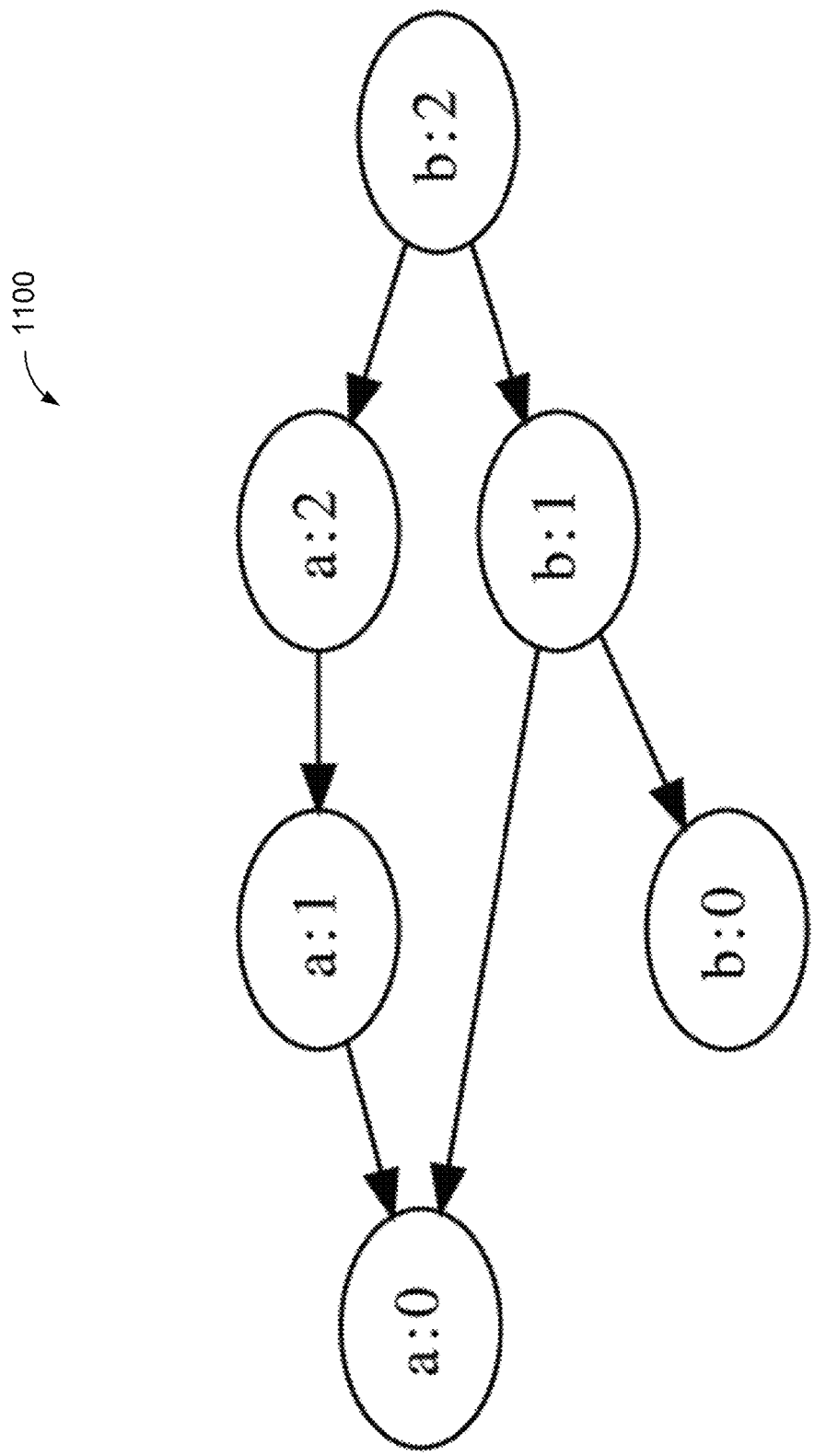
FIG. 11 is a schematic view of a plausible ad hoc graph of the progression policy of FIG. 10.

It is also notable that this policy is the only one that is guaranteed by the default, real time, execution mode. The event loop, by virtue of being a loop, guarantees that task ticks are executed in order. Everything else is enforced very loosely because of wall time scheduling and time synchronization errors. Even though there is no execution graph for real-time execution, an ad hoc graph may be built after the fact, which adds an edge between two ticks if one tick happened entirely after the other one had published all its messages. For example, FIG. 11 includes a graph 1100 that is a plausible ad hoc execution for the diagram 900. For clarity purposes, graph 1100 is illustrated with the minimal graph whose transitive closure is the ad hoc graph. In FIG. 11, node b's first tick (where time 1 s equal to 0 s) does not see any message from node a, while node b's second tick sees a delayed message. Node b's last tick views the most recent message from node a that is theoretically available.

In some implementations, the system adds the minimum number of edges to a policy to guarantee strong causality. For example, when node a feeds node b and node a's period is $p_a$ and node b's period is $p_b$, then strong causality is achieved by adding an edge from ($b:t_b$) to ($a:t_a$) whenever:

$$t_b = \max\{t \in \mathcal{R} \mid t \le t_a\} \qquad (1)$$

Figure 12:
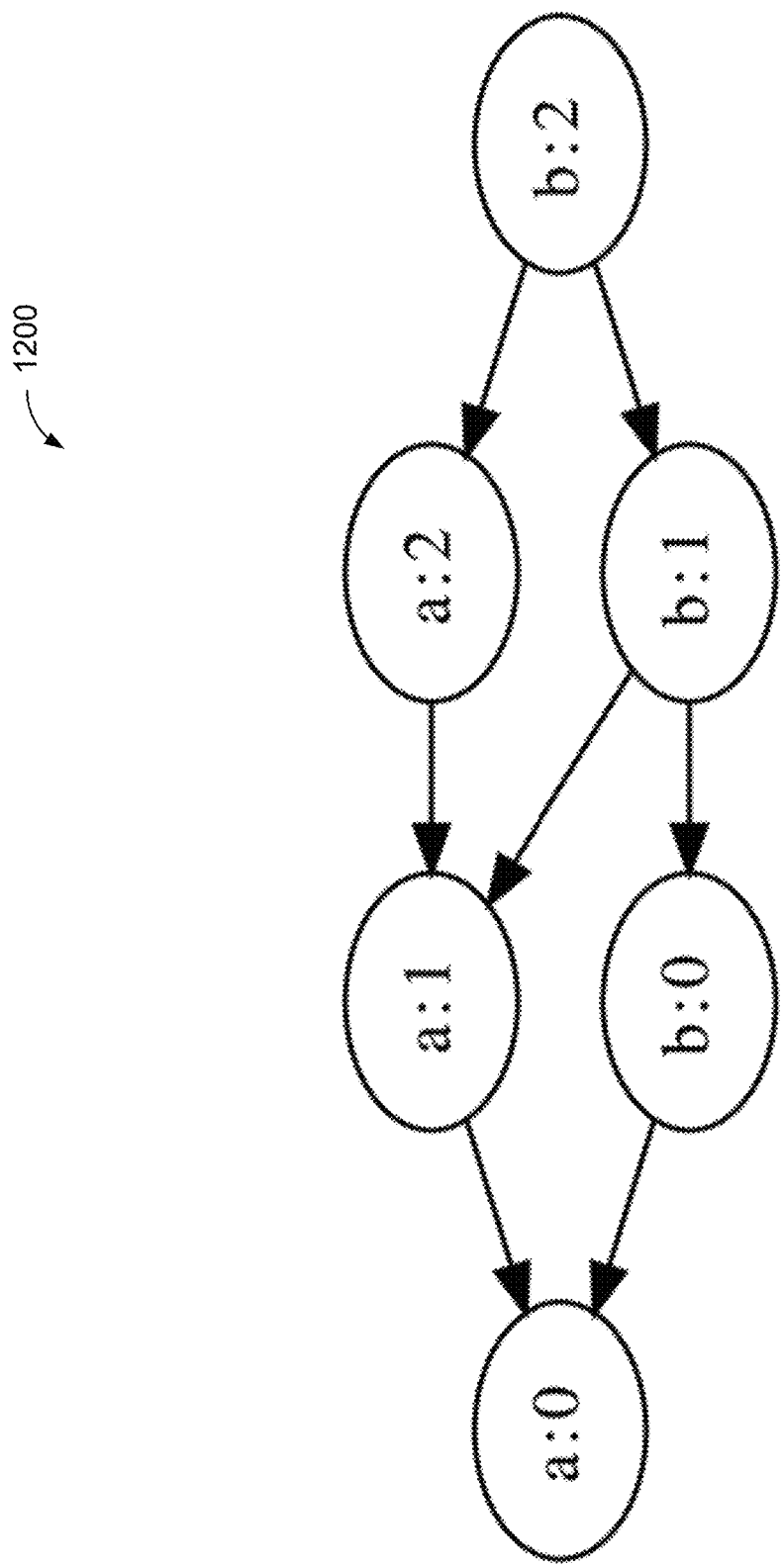
FIG. 12 is a schematic view of a strong causality policy.

In Equation (1), $t_b$ is the largest real number that is smaller than or equal to $t_a$. FIG. 12 includes an execution graph 1200 that illustrates such strong causality.

Figure 13:
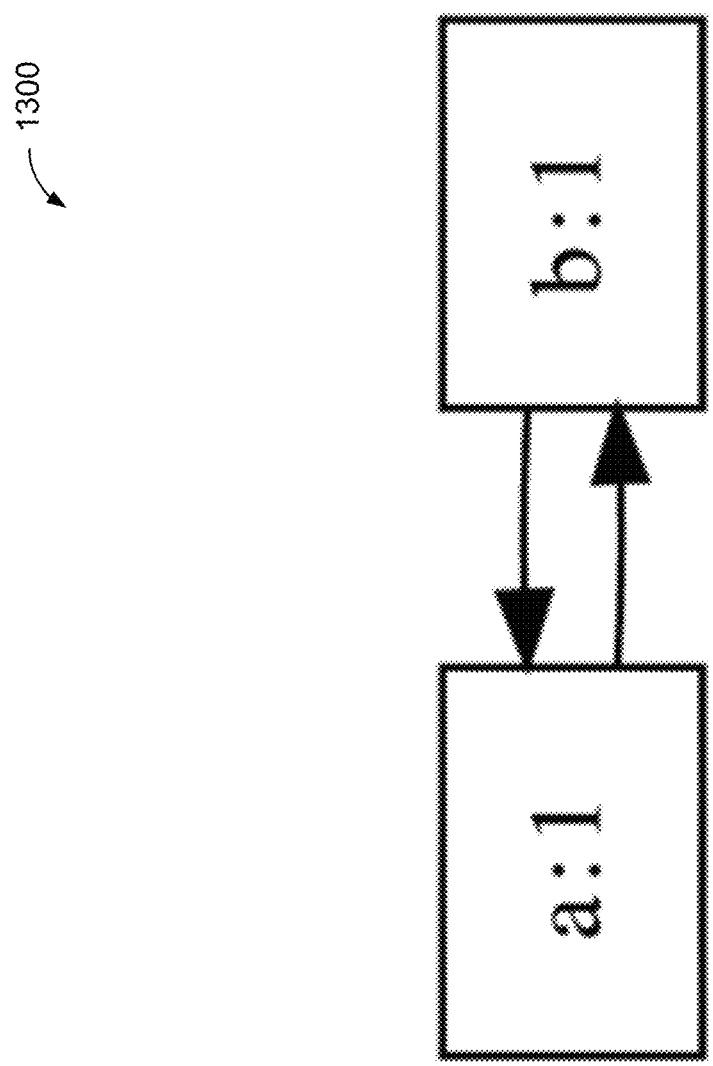
FIG. 13 is a schematic view of a two-way discrete diagram.
Figure 14:
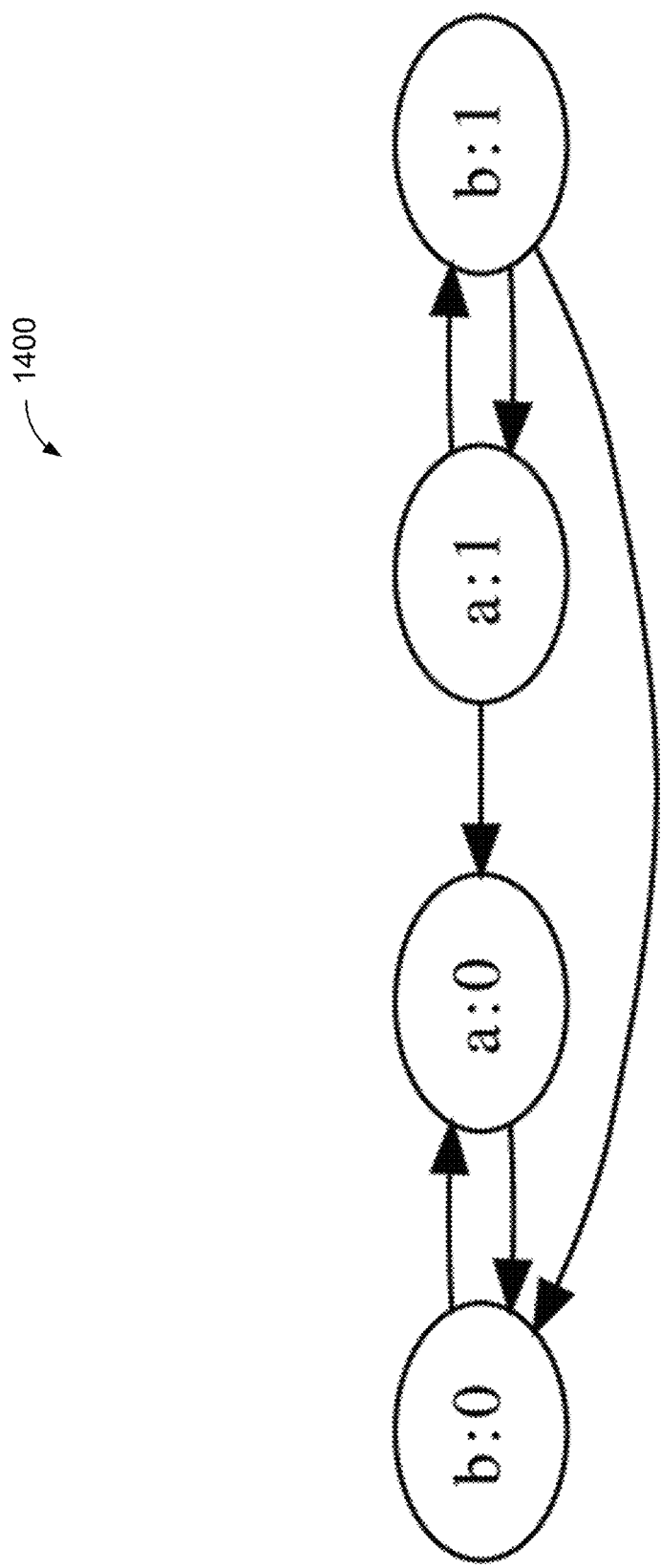
FIG. 14 is a schematic view of a strong causality policy of the discrete diagram of FIG. 13.
Figure 15:
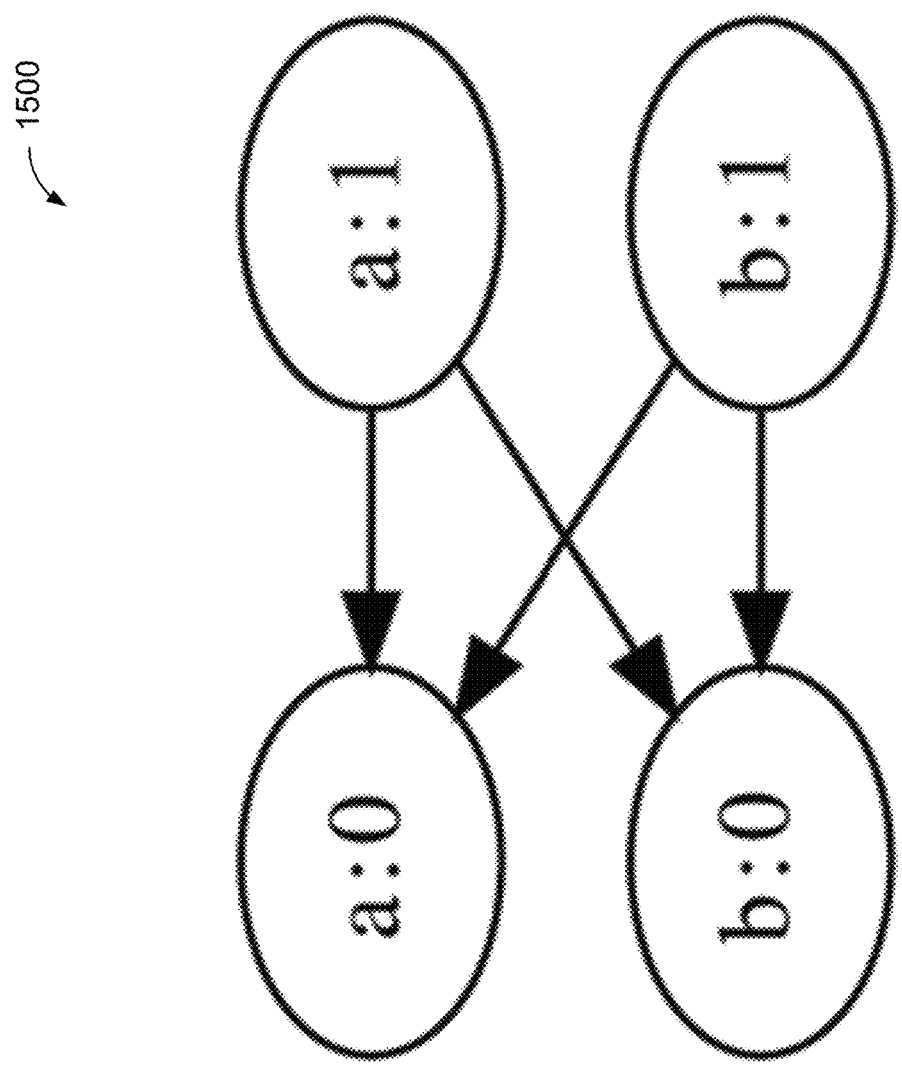
FIG. 15 is a schematic view of a weak causality policy of the discrete diagram of FIG. 13.
Figure 16:
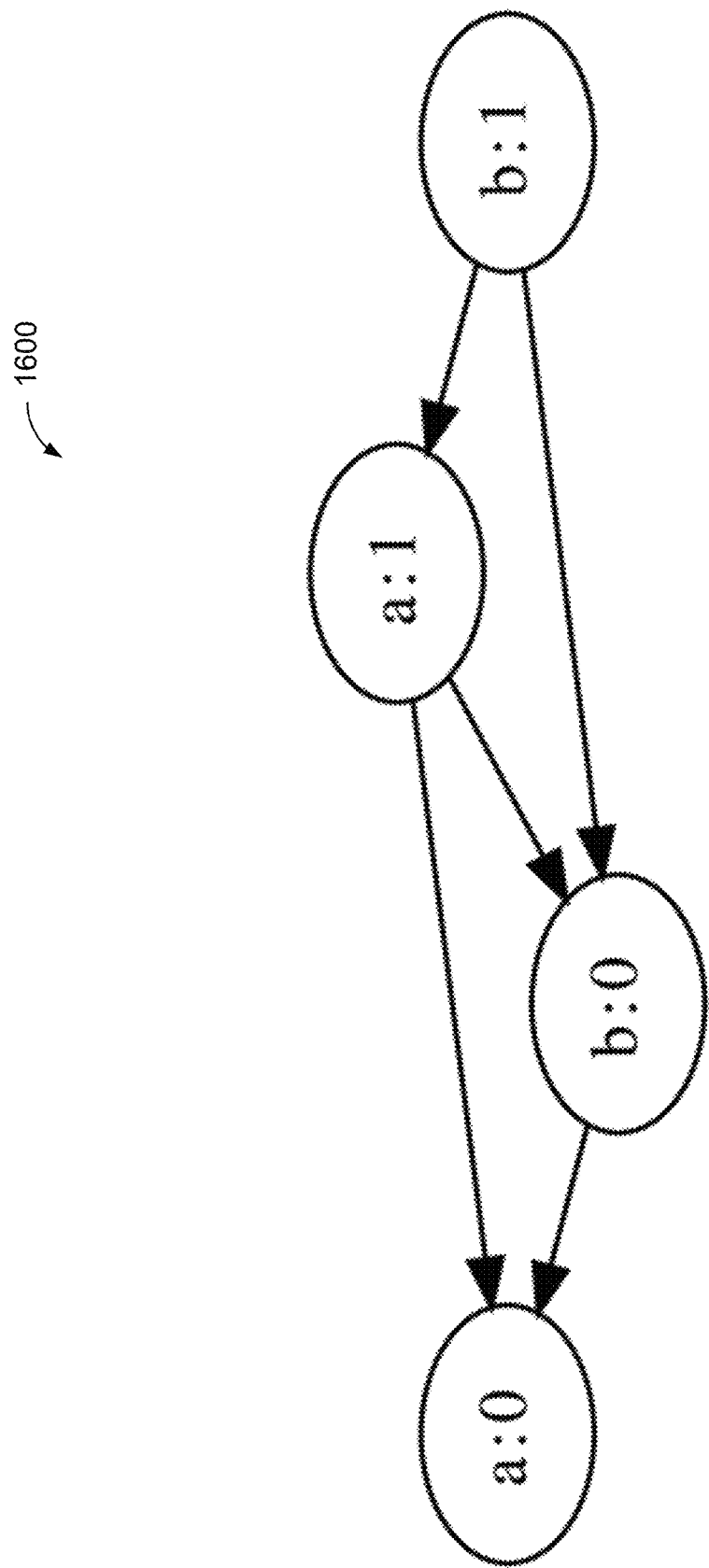
FIG. 16 is a schematic view of a weakish causality policy of the discrete diagram of FIG. 13.

FIG. 13 includes a cyclic block diagram 1300 that translates to a strong causality policy execution graph 1400 (FIG. 14). However, the execution graph includes two cycles that renders the execution graph invalid. This may be generalized to say that cyclic graphs cannot be executed to satisfy strong causality. This is the case even when the tasks in the cycle have different periods, because, eventually, their ticks will synchronize. Weak causality, on the other hand, is achievable. It amounts for each task to read in an older message, i.e., to introduce delays into the system. FIG. 15 includes an execution graph 1500 that demonstrates a strict weak causality policy. The policy may be defined as less strict by choosing to "sacrifice" node a as the block with a delayed input (i.e., a "weakish" causality policy or a "semi-weak" causality policy) which is illustrated with graph 1600 of FIG. 16. This demonstrates the primary tradeoff achieved when dropping strong causality. That is, to maximize accuracy, minimize the number of introduced delays (i.e., a weakish policy). Alternatively, to maximize performance, maximize the number of introduced delays (i.e., a weak policy).

Delays impact accuracy because applications generally desire the latest messages available. Delays boost performance because there are fewer "stages" with the weak policy. To define this precisely, the number of stages is the length of the longest path of an execution graph. A more intuitive definition is that the number of stages is the minimum number of columns needed in order to represent the execution graph under the constraint that if there is an edge from $n_1$ to $n_2$, then $n_1$ must be in a column to the right of $n_2$. Some rendering engines may minimize the number of columns, thus providing the number of stages by default. Here, the weak diagram (FIG. 15) has two columns while the weakish diagram (FIG. 16) has four columns, thus the weak diagram is faster. If all ticks take the same amount of time to execute, then the ratio of stages provides the performance improvement directly. If not, "weak" is still guaranteed to be faster than "weakish," and the ratio is the ratio of the longest path lengths.

Figure 17:
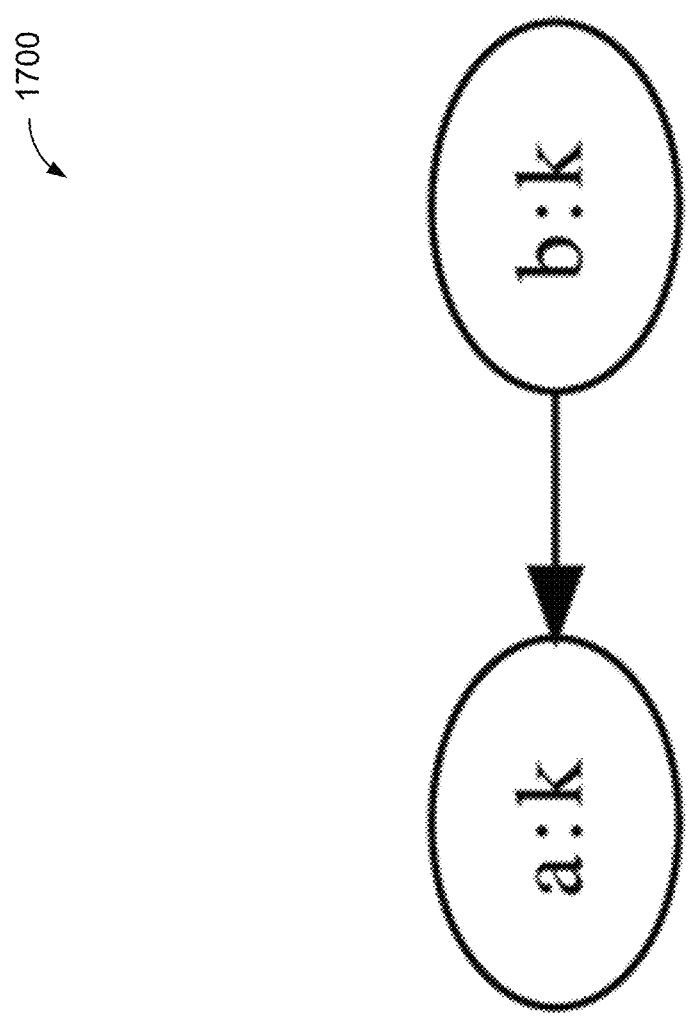
FIG. 17 is a schematic view of a generator.
Figure 18:
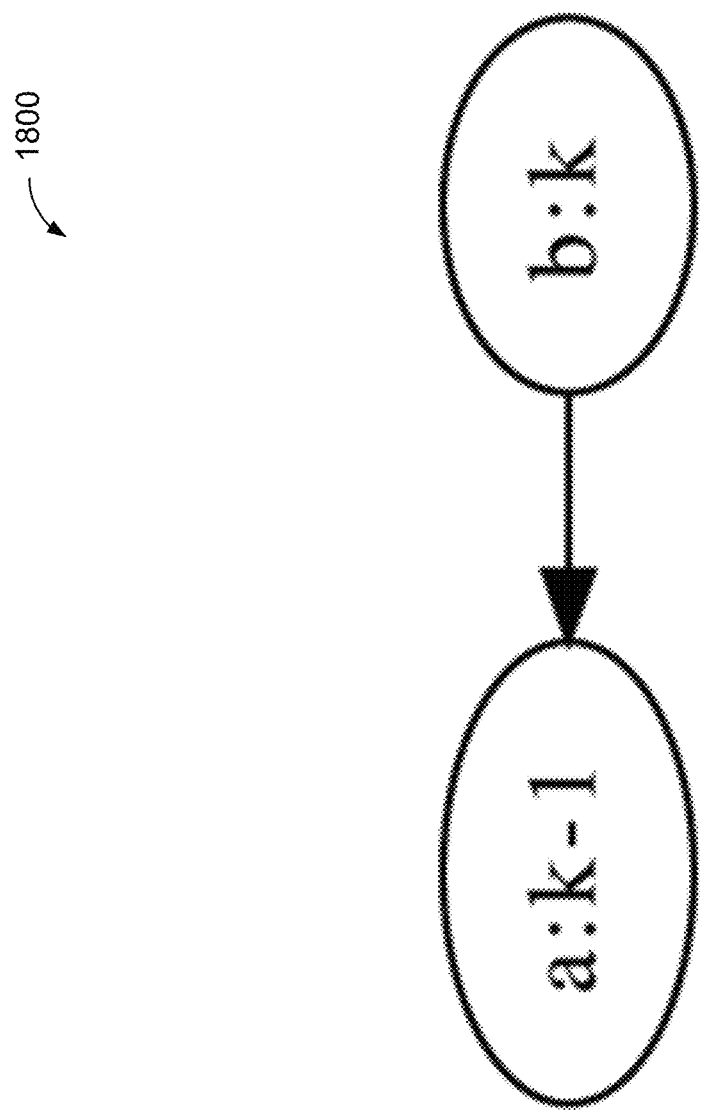
FIG. 18 is a schematic view of a replacement generator for the generator of FIG. 17.

FIGS. 17 and 18 demonstrate the generator replacement that occurs whenever an edge is delayed (e.g., when a delay is introduced from node a to node b). FIG. 17 illustrates the old generator with graph 1700 (applied at time 1). FIG. 18 illustrates the new generator 1800. The weakish policy requires finding a minimum feedback arc set, a known NP-hard problem that admits good polynomial-time approximations. The minimum is not necessary to break cycles, however, so the weakish policy may be relaxed to not necessarily find the minimum (e.g., a family of weakish policies). This procedure yields a valid acyclic execution graph by adding edges towards nodes in the past and there are never any nodes towards the future to close those cycles.

In some implementations, a tool or system or module interactively aids in selecting edges to delay. The tool allows users to select edges to delay preferentially from a graphical user interface (GUI) illustrating all the cycles in the diagram. The tool can also select edges automatically based on several heuristics that the user can choose from. For example, one heuristic may be to pick the edge with the source node with the fastest period, which may minimize the value of the delay being introduced.

Some block diagram simulation tools may enforce strong causality, but these tools typically follow a fundamentally different execution model that allows the tool to directly marshal data between blocks. These tools may warn about cycles (e.g., algebraic loops) and solve these cycles iteratively. In some applications, cycles are instead resolved in an ad hoc fashion with the random introduction of delays. Some tools also suggest for the user to explicitly introduce delays in the diagram. Those delays are applied at all times. In contrast, the weakish policy adds those delays automatically and only applies the delays on ticks that actually require the delays because they are in a cycle (as happens when tasks run at different frequencies). Also, these conventional tools cannot run tasks concurrently in a normal desktop simulation and have limited concurrent simulation capabilities in generated code.

Notably, strong causality is impossible to achieve every time there is a cycle in the communication graph. Instead, this leaves only weak and weakish policies. The weak policy may be the preferable policy whenever simulating as fast as possible is the primary objective. Delaying many messages is not a concern for two related reasons. First, not all messages will really get delayed. Instead, some ticks will get the most recent input data depending on execution time. The same phenomenon happens in real time. If strong causality is impossible in simulation, it is also impossible in real time.

Figure 19:
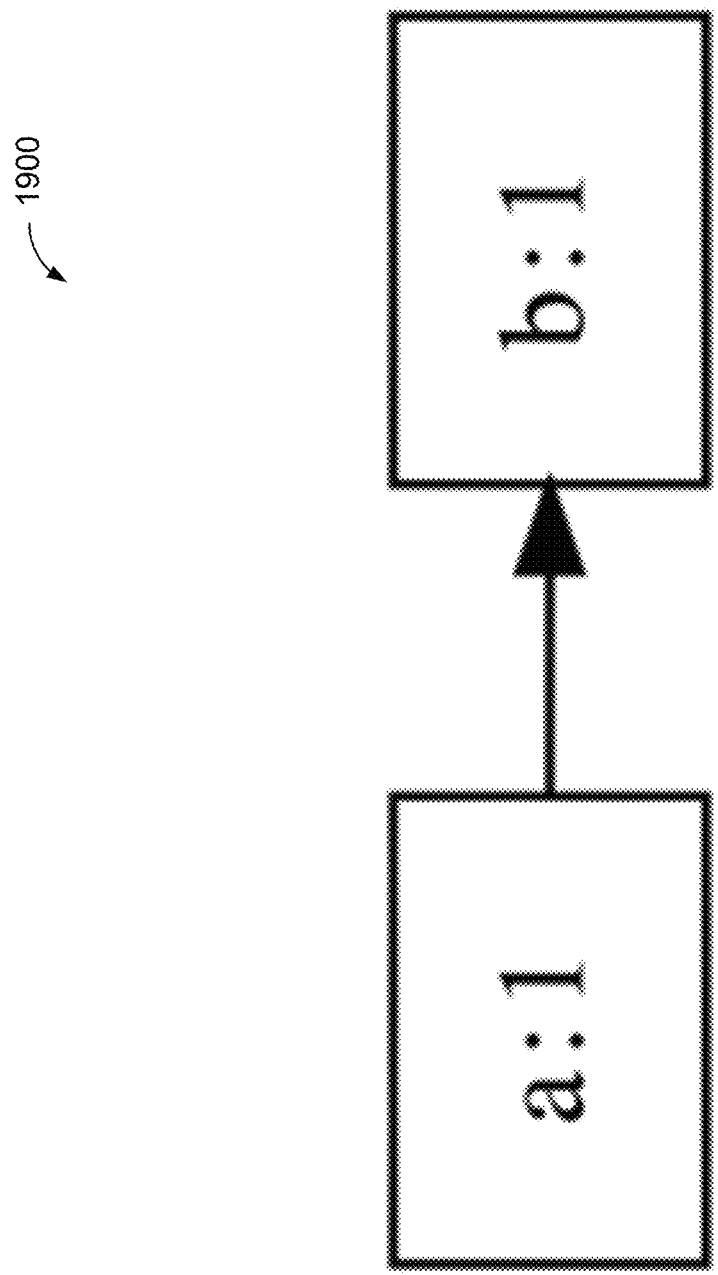
FIG. 19 is a schematic view of a discrete diagram.
Figure 20:
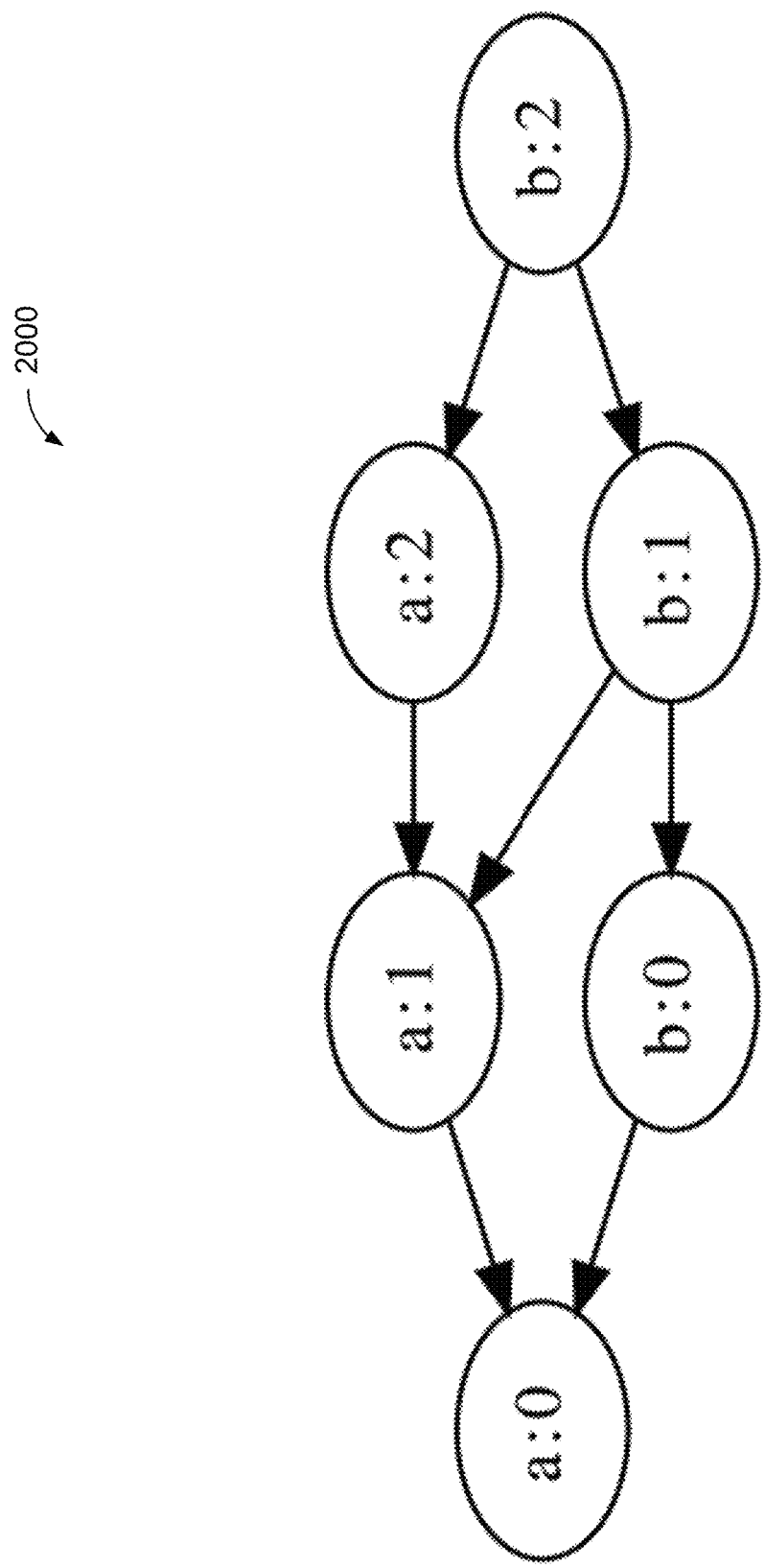
FIG. 20 is a schematic view of a strong causality policy of the discrete diagram of FIG. 19.

To consider determinism, FIG. 19 includes an acyclic diagram 1900. FIG. 20 includes a strong policy execution graph 2000 for the diagram 1900. Notably, (a:2) and (b:1) are allowed to run concurrently. When they do, it is possible for (a:2) to publish a message that is received by (b:1) before node b consumes node a's message. This indicates that node b will sometimes consume a message from the future. A message from the future is defined as a message with a time stamp that is greater than what the local system clock outputs. This may happen without incurring any harm on the vehicle due to clock synchronization issues. However, this breaks determinism because it does not happen consistently. It may be the only source of nondeterminism in this execution model, assuming all tasks are deterministic themselves and that communication is reliable.

Figure 21:
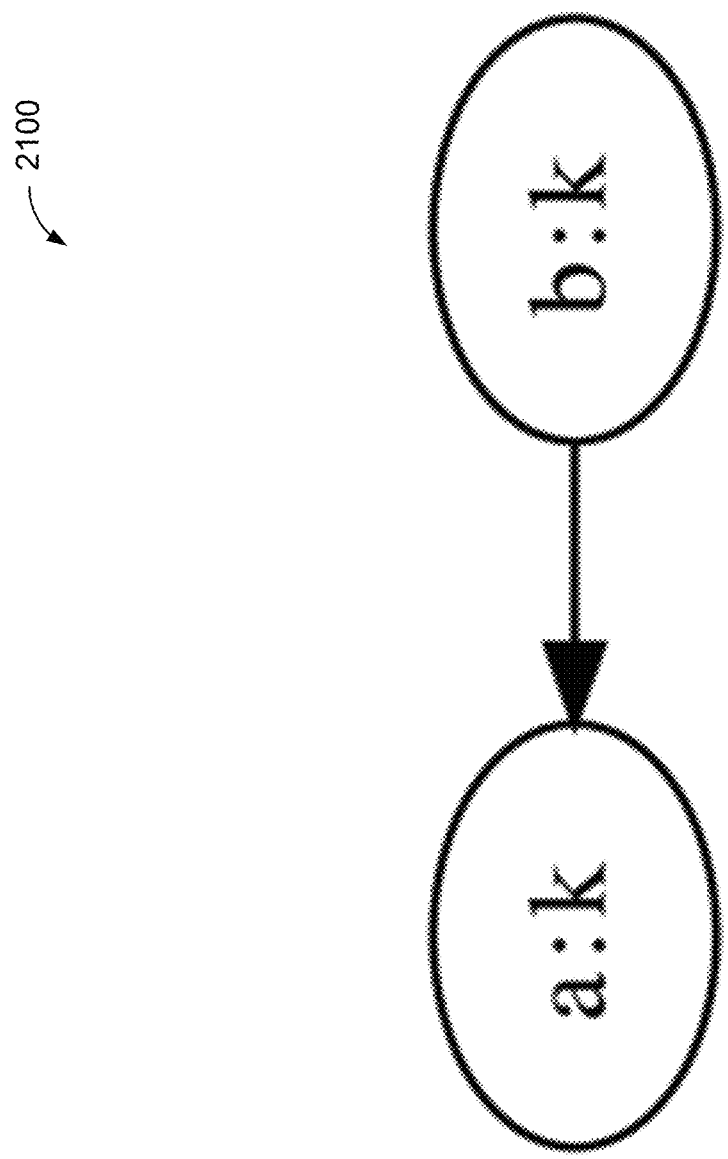
FIG. 21 is a schematic view of a strong policy generator for the discrete diagram of FIG. 19.
Figure 22:
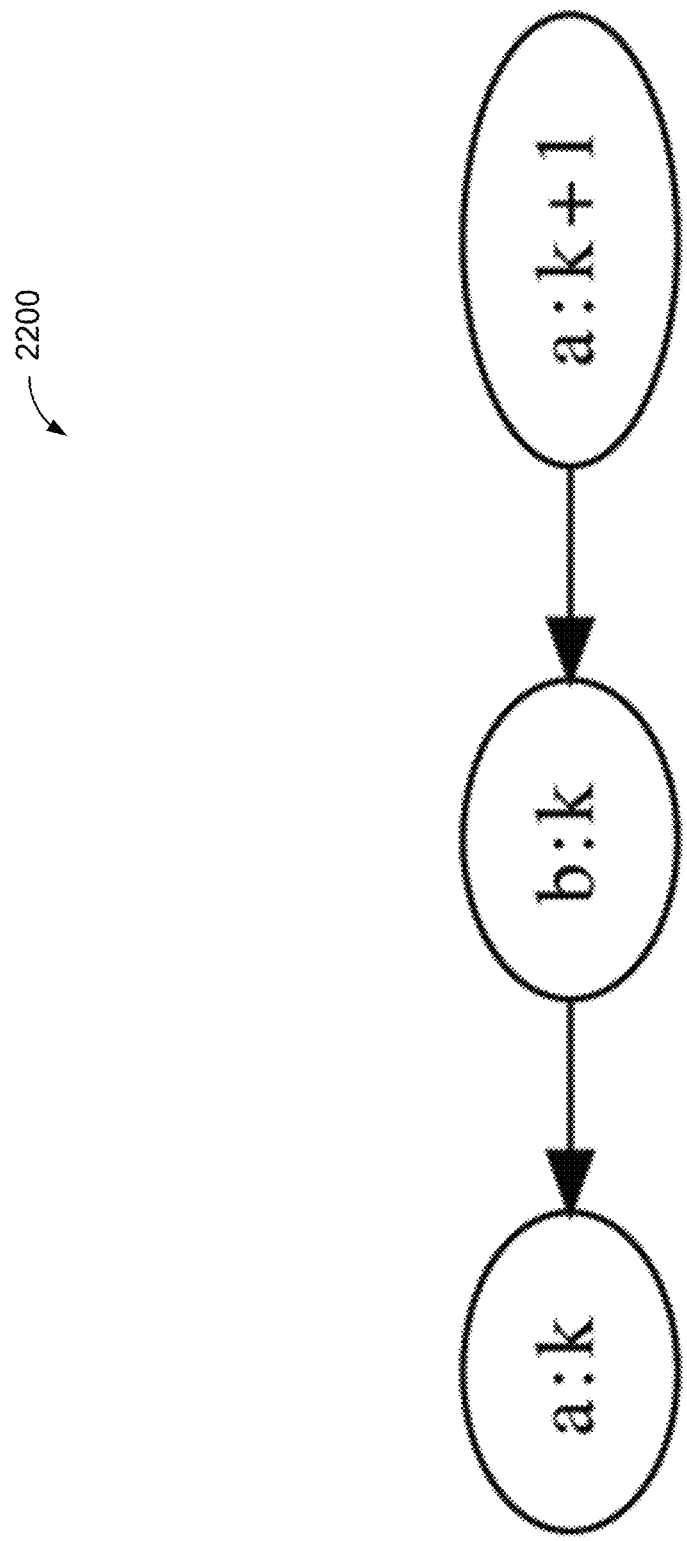
FIG. 22 is a schematic view of a double edge deterministic generator.
Figure 23:
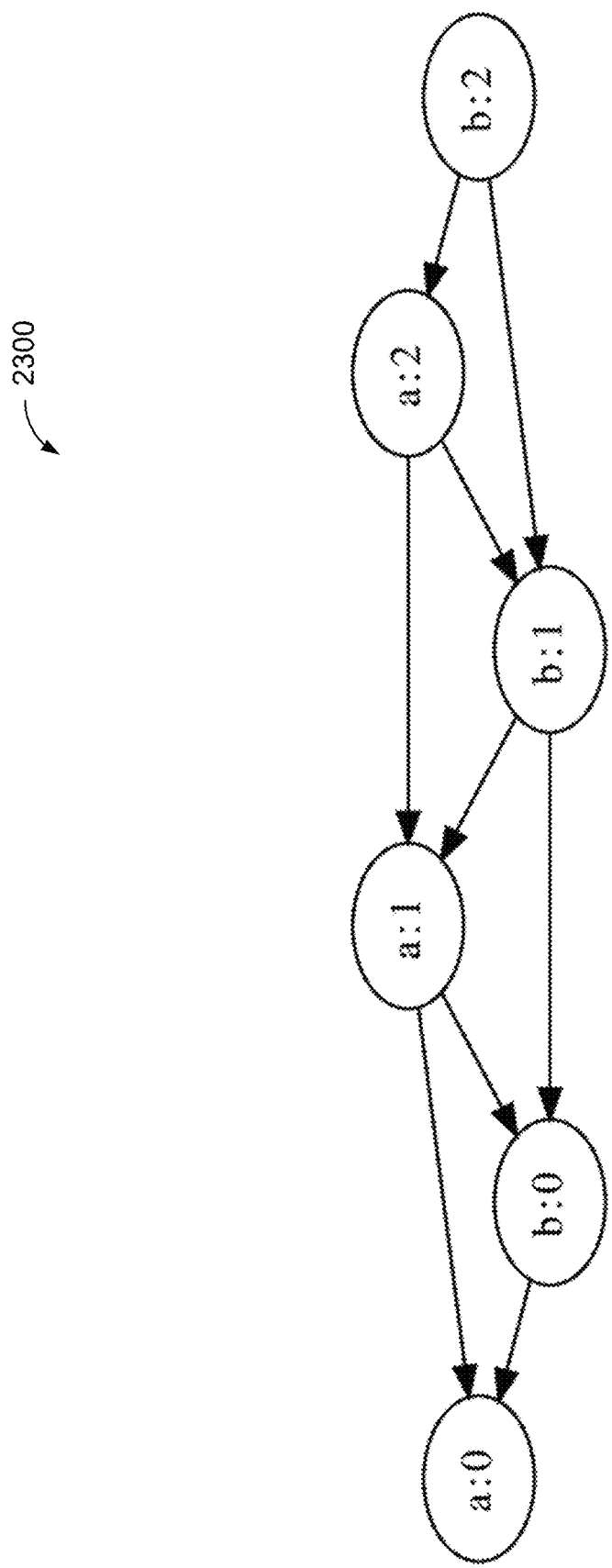
FIG. 23 is a schematic view of a naive determinisms policy.

The minimal solution for correcting this nondeterminism is to prevent any two tasks that talk to each other from executing concurrently. In this case, node a and node b should never execute at the same time. To enforce this, FIG. 21 includes a graph 2100 of a generator addition of the strong causality policy. Specifically, an edge is added between node a and node b at each point in time. This generator may be augmented with an edge from node a's next tick to node b's current tick. FIG. 22 illustrates a deterministic generator 2200 with a double-edge. This new generator 2200 (i.e., a double-edge generator) ensures that node a and node b never execute concurrently. Replacing the old generator (FIG. 21) with the new generator (FIG. 22) results in a policy that guarantees determinism. FIG. 23 includes an execution graph 2300 for the generator 2200 (i.e., a naive determinism policy).

Figure 24:
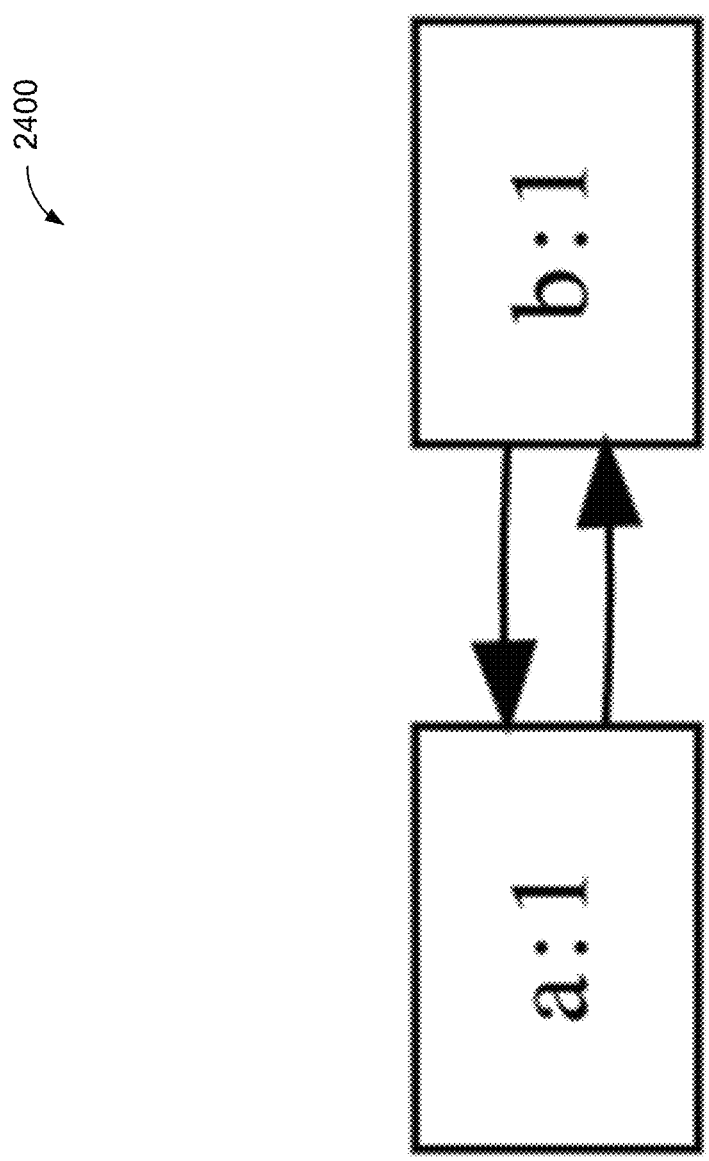
FIG. 24 is a schematic view of a two-way discrete diagram.
Figure 25:
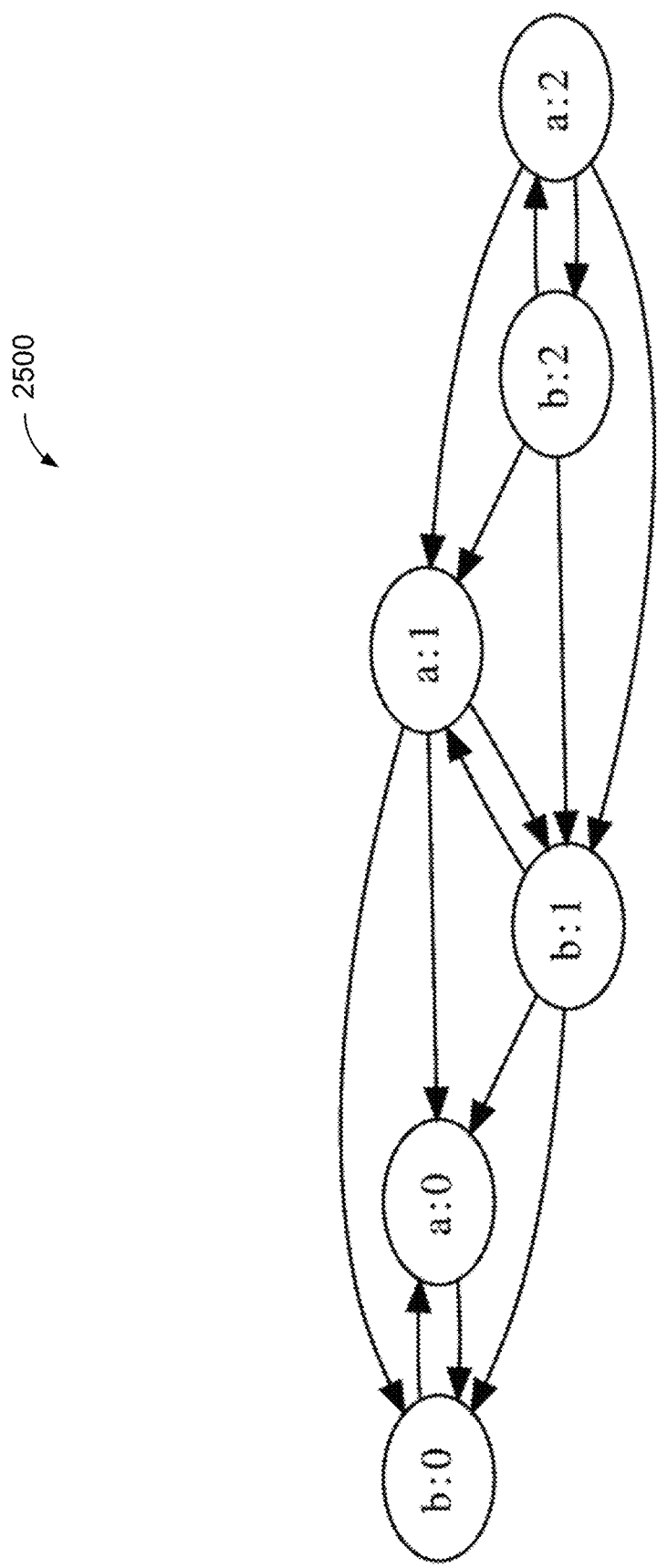
FIG. 25 is a schematic view of a naive determinism policy for the discrete diagram of FIG. 24.
Figure 26:
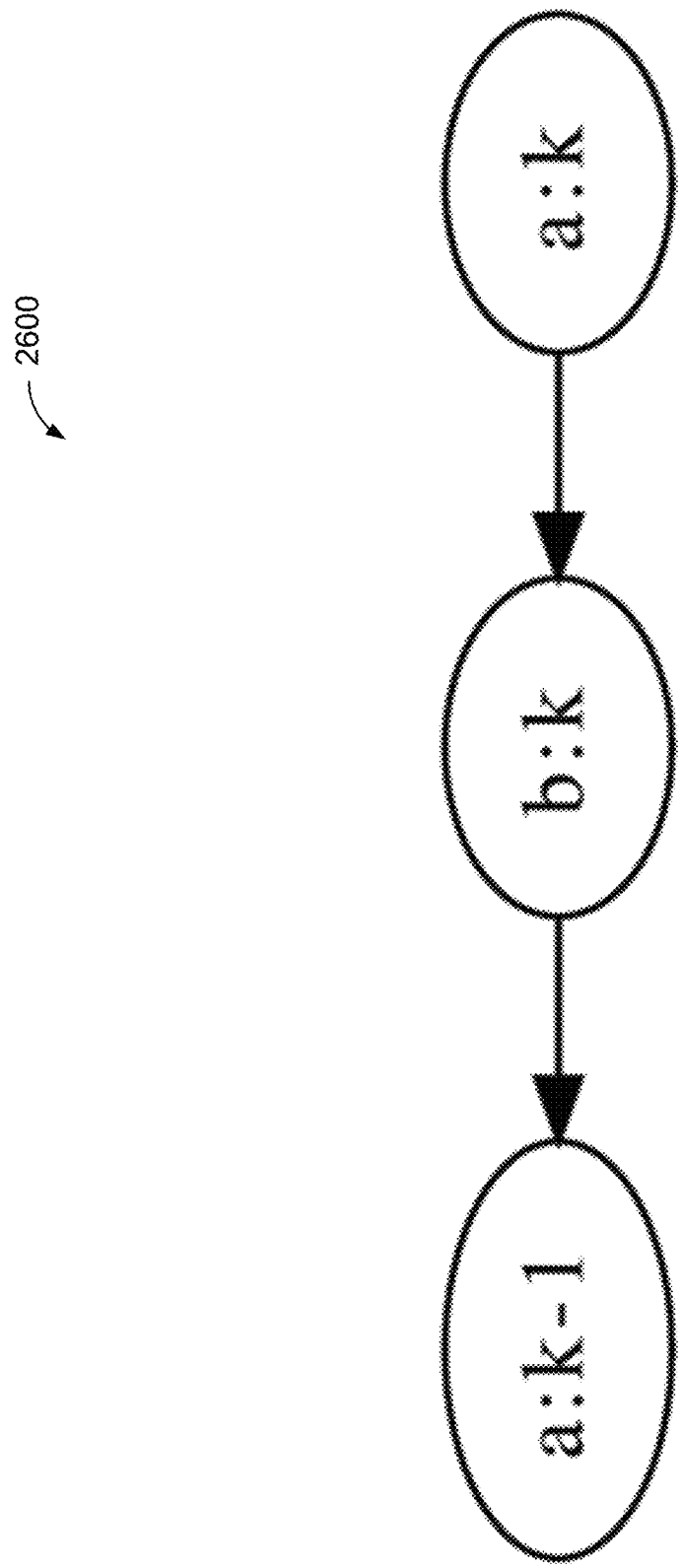
FIG. 26 is a schematic view of a delayed double edge generator.

Referring now to a cyclic diagram 2400 of FIG. 24 with two-way communication, applying the naive determinism policy of FIGS. 22 and 23 results in a graph 2500 of FIG. 25. This graph 2500 is not acyclic. Instead, FIG. 26 includes a delayed double-edge generator 2600 (compared to the double-edge generator of FIG. 22). This generator 2600 will guarantee determinism by preventing the two tasks from ever executing at the same time. However, to determine the policies that balance the performance/accuracy tradeoff discussed previously without introducing new cycles the edges of the generator 2600 must be considered. The edge from (b:k) to (a:k−1) is toward the past, and cannot therefore be in a cycle as explained previously. The second edge, from (a:k) to (b:k), happens to be the edge from (b:k) to (a:k), reverted. If all such edges are in an original minimal feedback arc set, then reverting them cannot introduce a cycle. This implies that the weakish policy will be effective here if fed a minimal feedback arc set. Note that this requires a minimal set, not a minimum.

Figure 27:
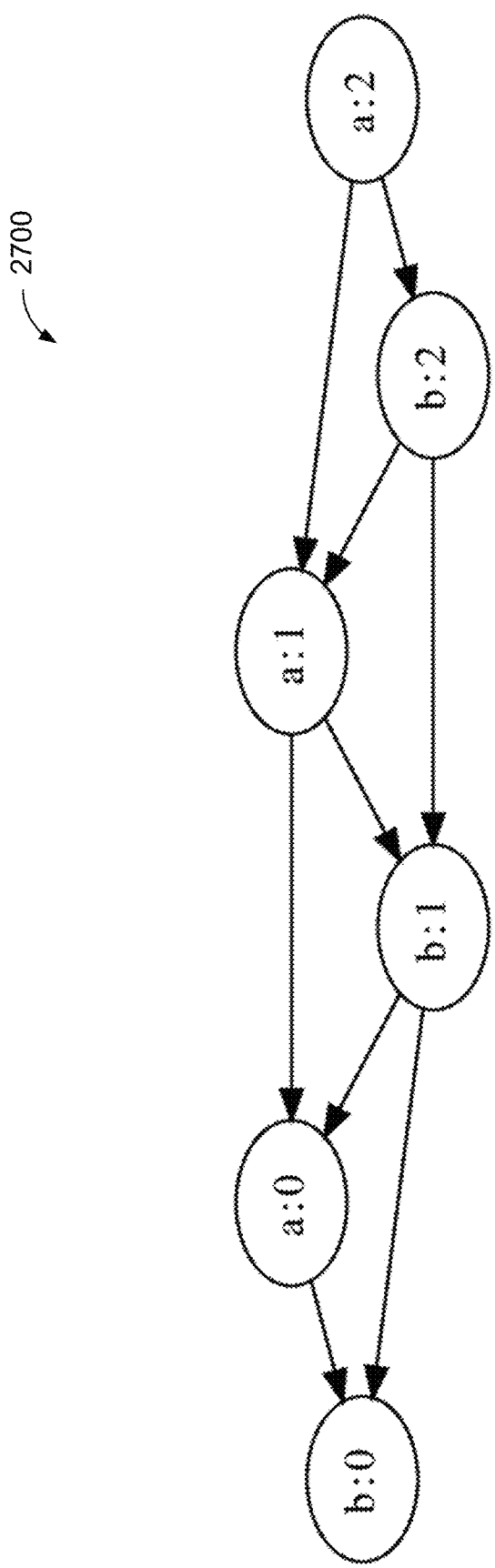
FIG. 27 is a schematic view of a slow determinism policy of the discrete diagram of FIG. 24.
Figure 28:
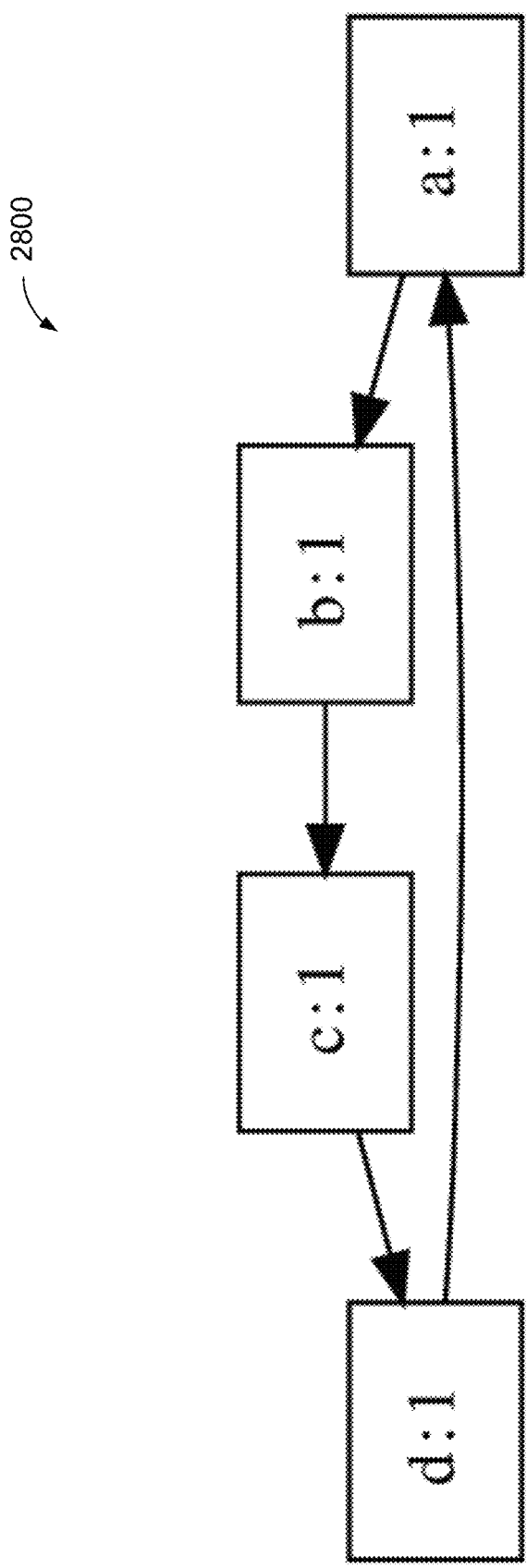
FIG. 28 is a schematic view of a four node cycle.
Figure 29:
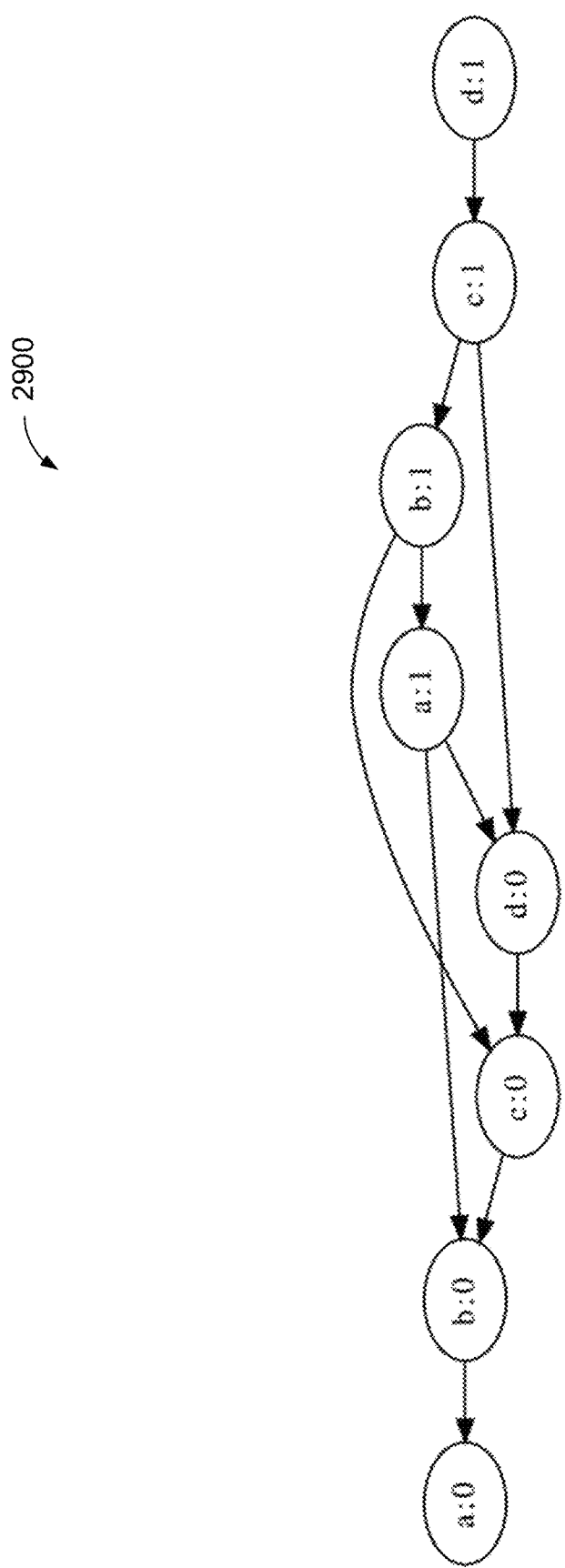
FIG. 29 is a schematic view of a slow determinism policy for the four node cycle of FIG. 28.

This may be defined as a "slow determinism policy." FIG. 27 illustrates this slow determinism policy with a graph 2700 including a node b receiving delayed inputs from node a. Once again, this policy results in serial execution of all ticks. To demonstrate this performance issue further, FIG. 28 includes a more elaborate example. Here, a graph 2800 includes a four node example. Assuming the d→a path is chosen to be delayed, an execution graph 2900 (FIG. 29) is generated (i.e., slow determinism). This example does not include any parallelism. The weak policy may be extended by delaying all communication using the delayed double-edge generator. However, this always results in exactly the same graph as the naive determinism policy (i.e., deterministic but cyclic).

Figure 30:
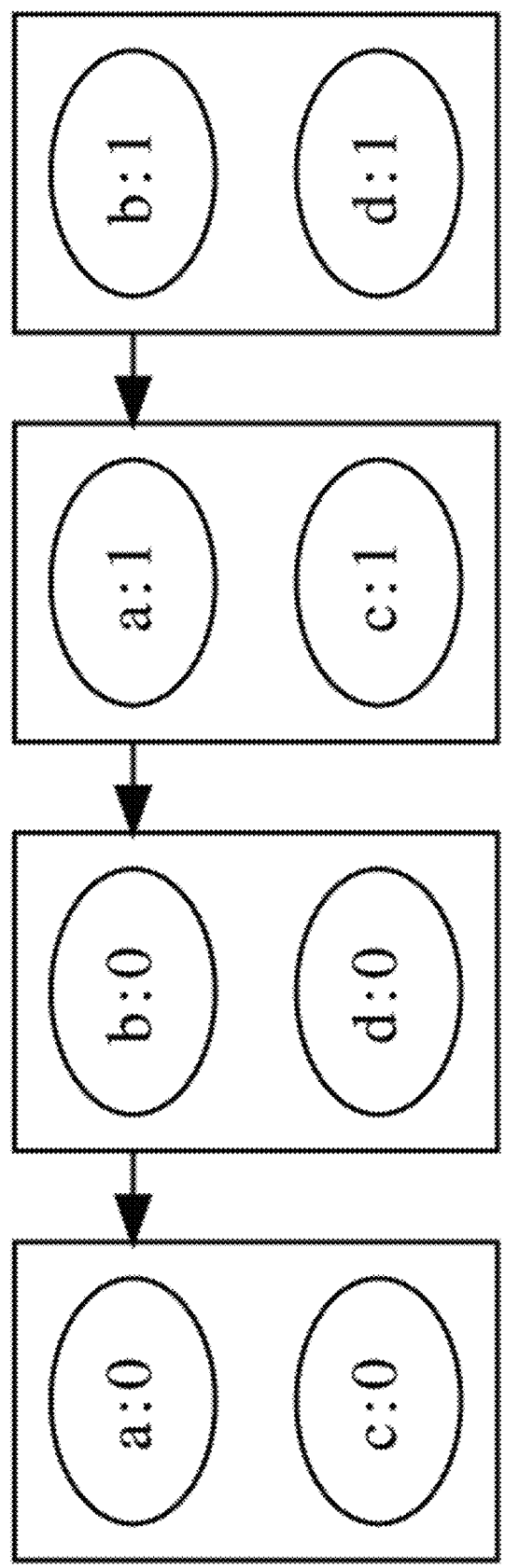
FIG. 30 is a schematic view of a minimum clique cover using supernodes.

Intuitively, since node a and node c do not communicate directly, these nodes may execute in parallel. Similarly, node b and node d could be executed in parallel. By calling out the two pairs of nodes, the system may determine a minimum clique cover for the complement of the graph 2900. The minimum clique cover is another NP-hard problem that has efficient approximations, in particular quadratic greedy solutions. Here, the minimum is not necessary. Instead, the cover should be as small as possible in order to maximize performance. Once a cover is obtained, a naive approach would be to isolate the pairs and execute the pairs as super nodes, where each group behaves like a single node, waiting in unison for all the dependencies to be available (FIG. 30).

Figure 31:
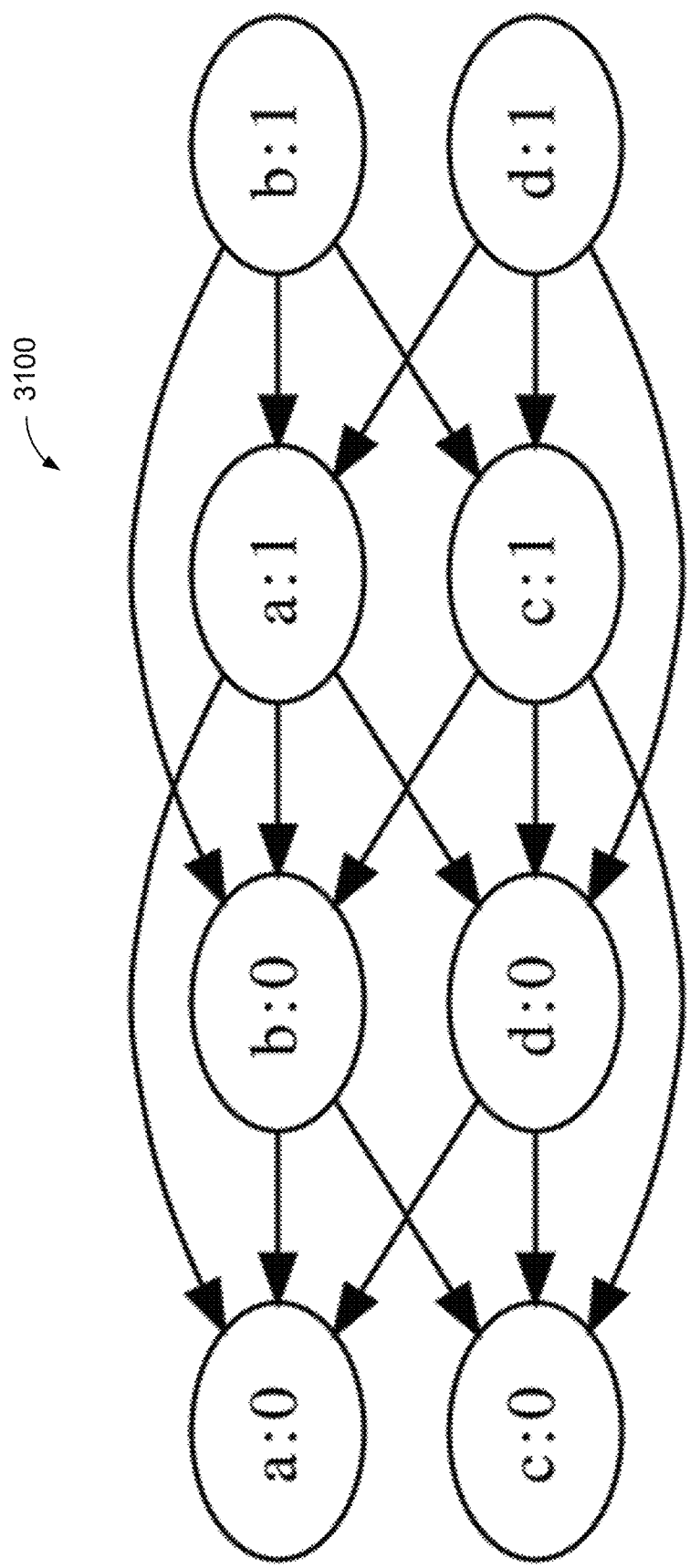
FIG. 31 is a schematic view of a minimum clique cover policy.

However, in some scenarios, supernodes can be bad for performance. Instead, the system may use a polynomial-time algorithm to go from supernodes to execution graphs. The algorithm may include finding a clique cover and picking an order. For each clique, for each element in the clique, and for each precursor in a subsequent clique, the algorithm may include applying a delay double-edge to a corresponding edge. This procedure yields a deterministic acyclic execution graph. For example, FIG. 31 includes an acyclic execution graph 3100 that represents the minimum clique cover policy of the supernodes of FIG. 30.

If all tasks take the same amount of time to execute, this is the fastest the diagram may be simulated deterministically with the current execution model. When all tasks do not take the same amount of time to execute, then a graph weighted by nodal execution times may be required to be analyzed.

Figure 32:
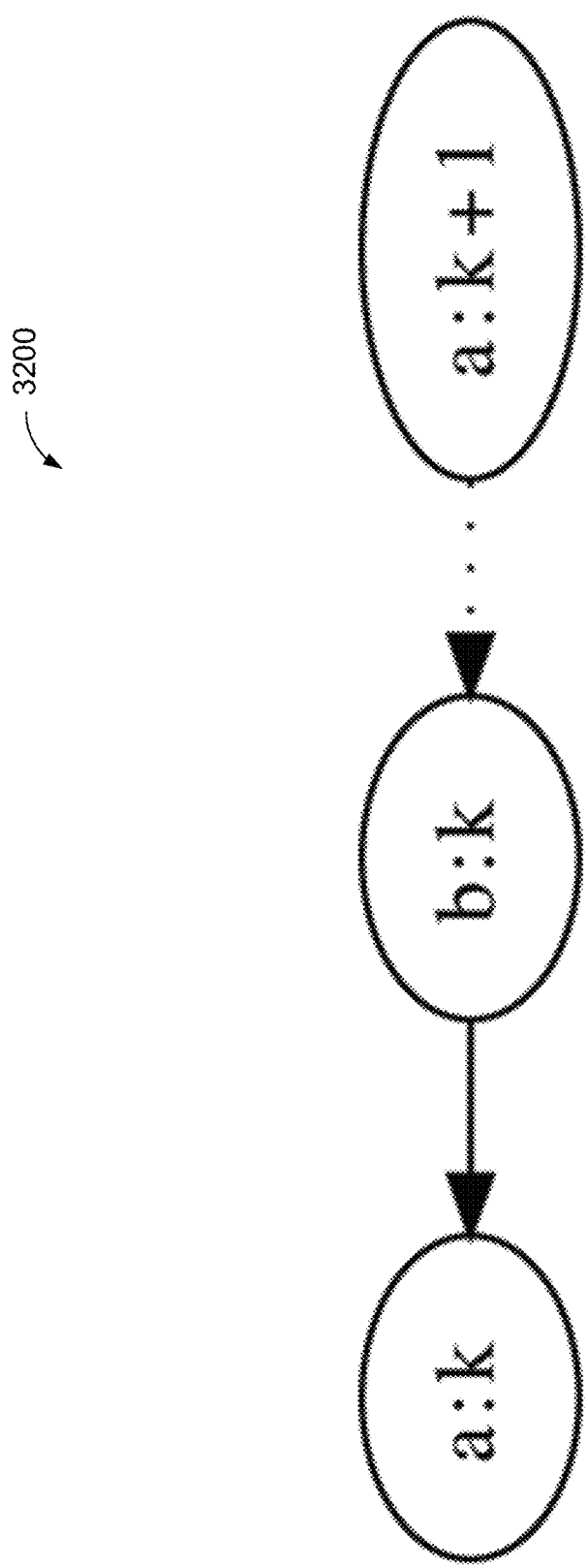
FIG. 32 is a schematic view of snapshot double edge generator.
Figure 33:
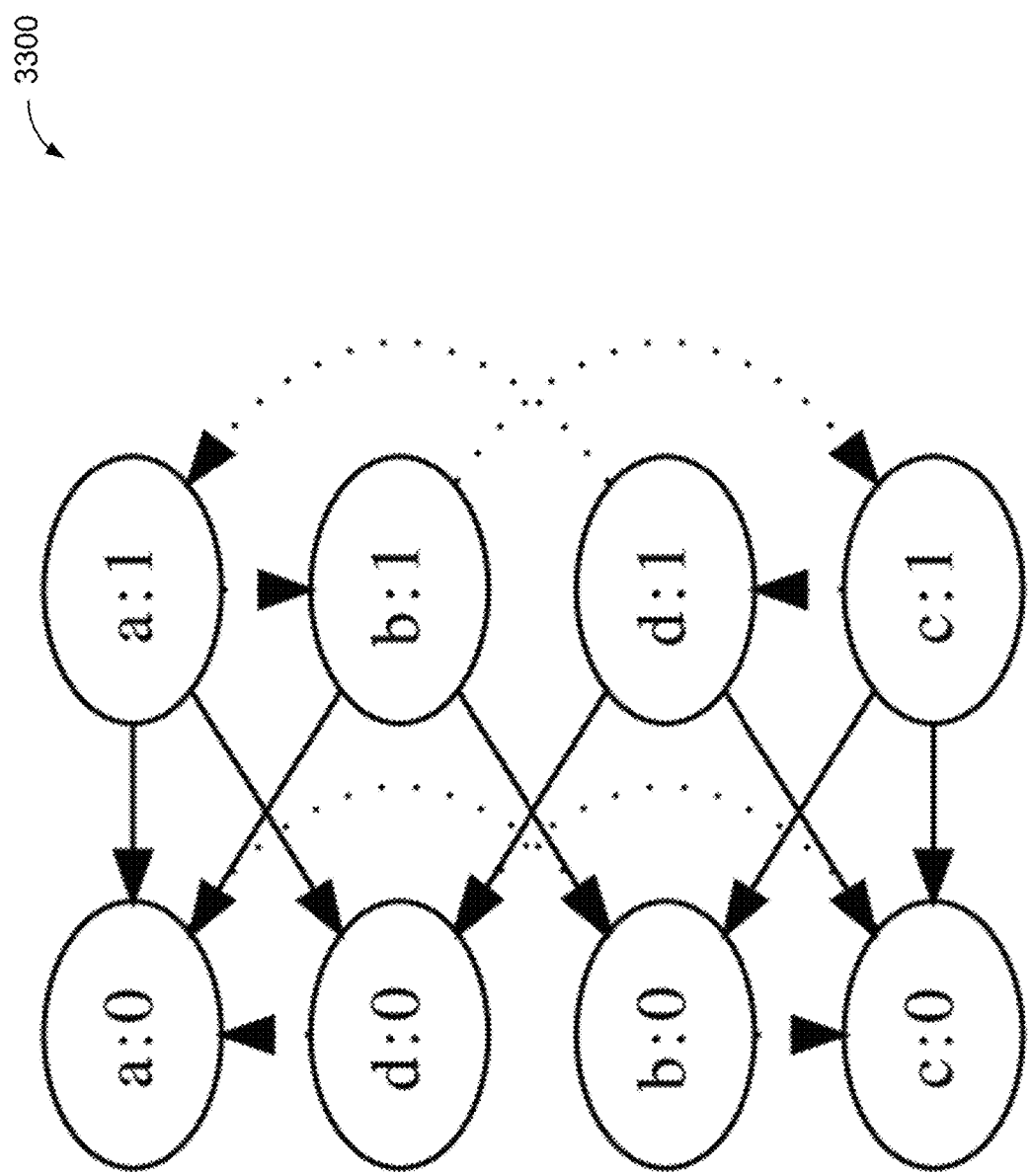
FIG. 33 is a schematic view of a fast determinism policy with snapshot isolation.

In order to further increase performance, implementations herein include an adjustment to the execution model. In some examples, the system takes a "snapshot" of all the channels that a task subscribes to as a reader at the beginning of every tick, and uses that snapshot during the entire tick. This provides a significant change to the double-edge's second edge (FIG. 22). Note that the only purpose of the second edge is to prevent (a:k+1) from interfering with (b:k)'s reads. With snapshot isolation, (a:k+1) does not have to wait for (b:k) to finish executing before executing but for it to have taken its snapshot. To reflect the new meaning, the second edge will be changed to a dotted line, as shown in FIG. 32 and graph 3200. Snapshot isolation may be implemented in several different ways. For example, the system may take an "lcm_handle" call out of a socket callback and instead delay the call until ready. If each tick is split up into two phases (i.e., a first phase of taking snapshots without reading/publishing and a second phase of reading from the snapshot and publishing), then the snapshot double-edge's second edge can no longer cause cycles. This is because all tasks in a cycle can gather their snapshots at the same time, and when at least one is done, the cycle disappears. The implications are significant as the system may implement the fast determinism policy by extending the weak causality policy with the double-edge, which results in the greatest amount of parallelism possible (i.e., two stages only in this example). FIG. 33 illustrates the four node cycle with graph 3300 showing fast determinism with snapshot isolation.

Because the snapshot is only of the channels that an application subscribes to, and many snapshot implementations incur no extra memory or time to implement (e.g., two queues that are used intermittently by the application while the unused queue accumulates messages for the next tick), performance impacts should be minimal.

Figure 34:
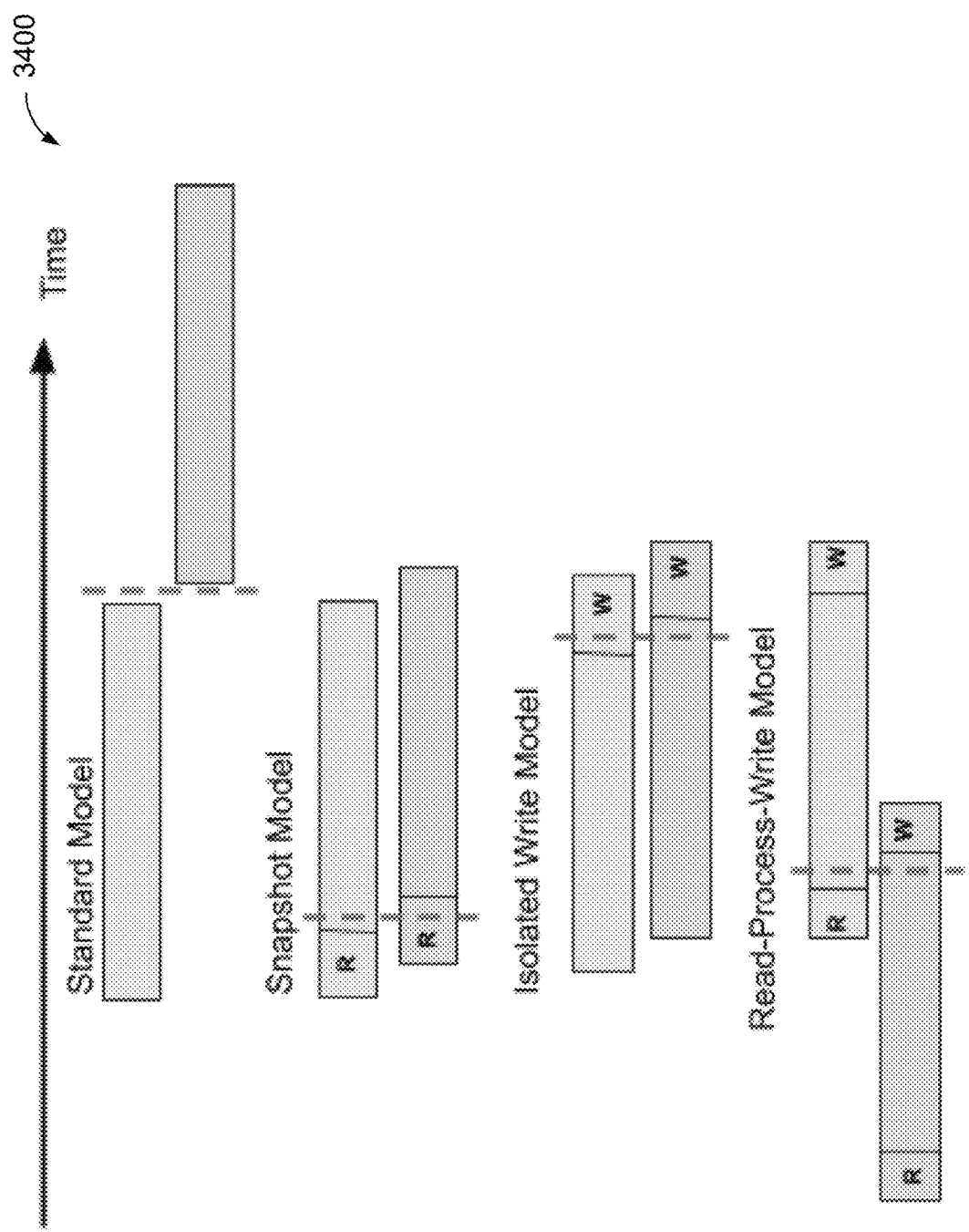
FIG. 34 is a timing diagram of time constraints for different models.

Thus, the snapshot model is equivalent to reserving some time at the beginning for all reads and preventing reads later on. When considering other options, such as reserving some time at the end for all writes or both, a number of models are available: a standard model, a snapshot model, an isolated writes model, and/or a read-process-write model. In each of these models, the second edge, i.e., the one from the task that writes to the task that reads, will have a different meaning, and, as a result, a different effect on performance (i.e., potential for parallelism). To illustrate this, FIG. 34 includes a diagram 3400 that shows the time constraints between two simultaneous ticks of two tasks where one task reads from a channel (i.e., the top task) that the other task writes to (i.e., the bottom task). In this example, time advances towards the right. What is important in this example is how soon the bottom task can execute. The dashed line indicates that the bottom tick cannot happen until this stage of the top tick has completed. For example, the standard model needs to wait for the top tick to have completely finished executing before beginning. In the Read-Process-Write model, the bottom task only has to wait for the top task to have taken its snapshot before writing, so it can potentially start and finish much earlier.

In some examples, the system may eliminate any constraints imposed by a subscriber on a publisher. That is, the system may implement the reverse (i.e., constraints imposed by a publisher and a subscriber) by incorporating publish timestamps into the logic. For example, at each node, the system may maintain a queue of message-timestamp pairs for each channel and, when a tick starts, the client may ignore any message in the queue that is more recent than the current time. While this may be effective, it requires maintaining an unbounded queue which may not be ideal when there are only two tasks such that the publisher's ticks are a lot shorter than the subscriber's ticks. This may allow for the publisher to build up a huge time advance on the subscriber. As a solution, the system may keep an upper bound on time advances. Note that just limiting the size of the queues will result in messages being dropped nondeterministically.

In some applications, it may be important to be able to inject randomness into simulation, even if made deterministic. For example, randomness (i.e., pseudo-randomness) in system time, may be adjusted to add a pseudo-random number to the current time. In these examples, the system may ensure that each simulation begins with the same seed to preserve determinism and the system may consider system time as an input (i.e., just like any other channel) so that two threads that never read from a channel but that query the current time now remain synchronized. That is, the system may include provisions to guarantee that time evolves monotonically. Additionally, whenever a dependency order is not unique for task ordering (which happens, for example, when picking an arbitrary clique cover order), randomness may be desirable from tick to tick.

Thus, in implementations herein, a system uses an abstraction of an autonomous vehicle software stack as a discrete diagram. The discrete diagram may be a simple (i.e., no parallel edges) directed graph with nodes annotated with a period for a task. The system includes an execution framework where time is frozen during each execution (e.g., in a default mode, time is "wall time" and each query returns different values) and each execution (i.e., "tick") of an application being simulated or tested depends only on other executions of the same application or other applications. In a default mode, tick scheduling may be accomplished through system time.

The system includes a formalism (i.e., execution graphs) to analyze execution policies (i.e., simulation algorithms) and their performance with respect to each of strong causality (i.e., each application always receives fresh inputs), weak causality (i.e., each application receives inputs that are not too old), and determinism (i.e., two simulation runs yield exactly the same results). The system also may include trivial execution policies for uniform progression, strong causality (when possible), and weak causality.

The system implements a "weakish" policy that balances a tradeoff between good performance (i.e., weak causality) and accuracy (i.e., strong causality that is sometimes unattainable). This weakish policy is optimal with a minimum feedback arc set. However, the policy is effective with any feedback arc set. The system provides an interactive tool to aid in edge selection and shows individual cycles and suggests edges to remove. The system may select edges automatically based on heuristics. For example, the system may favor edges with the fastest publisher and/or favor edges with the highest publisher/consumer frequency ratio.

In some examples, the system includes execution policies for determinism. For example, a default execution model is asynchronous (i.e., reads and writes can happen at any time during an execution) and the system implements a "double edge" by adding a constraint that a publisher must wait for a consumer (in addition to the reverse, which is necessary for causality). This ensures that the two tasks never execute at the same time. The double edges introduce cycles that render the execution graph infeasible, so the system may implement a slow determinism policy that requires a minimal feedback arc set. Optionally, the system includes an interactive tool to aid in/automate edge selection. For example, the tool uses task frequencies to maximize accuracy or uses task durations to maximize performance. The system may implement a fast determinism policy based on minimum clique cover with an interactive tool to help with cover selection. The tool may extend to take, for example, average task durations into account to maximize performance.

Optionally, the system includes other execution models. For example, the system may include a snapshot model, an isolated write model, and/or a read/process/write model. Additionally or alternatively, the system includes a new model involving time-informed queues where second edge in the double edge is not required that allows for simpler weakish/weak families of policies for richer performance/ accuracy tradeoffs (i.e., the weakish policy is faster than the minimum clique cover policy). Queues may grow without bound if certain tasks can advance in time much faster than others. To account for this, the system may include a time advance based limit, a memory budget based limit, and an interactive tool to choose between these limits (and any other limits).

The system (e.g., simulation environment) is provided the discrete diagram (i.e., task names, frequencies, and connections), and may provide one or more of options, such as execution model (i.e., default, snapshot, isolated write, read/ process/write, time-informed, etc.) and a determinism level (e.g., none or time-informed execution model). Some options may be dependent upon the execution model selected. The system may provide a secondary menu (based on the execution model selected) that includes discretionary options such as causality level (e.g., strong causality, weak causality, and/or weakish causality), an edge selection tool that may allow for edge selection, heuristic selection/parameterization, and/or may allow for node annotation with duration.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The system includes an image processor operable to process image data captured by one or more cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the system and/or processing and/or camera and/or circuitry may utilize aspects described in U.S. Pat. Nos. 9,233,641; 9,146,898; 9,174,574; 9,090,234; 9,077, 098; 8,818,042; 8,886,401; 9,077,962; 9,068,390; 9,140, 789; 9,092,986; 9,205,776; 8,917,169; 8,694,224; 7,005, 974; 5,760,962; 5,877,897; 5,796,094; 5,949,331; 6,222, 447; 6,302,545; 6,396,397; 6,498,620; 6,523,964; 6,611, 202; 6,201,642; 6,690,268; 6,717,610; 6,757,109; 6,802, 617; 6,806,452; 6,822,563; 6,891,563; 6,946,978; 7,859, 565; 5,550,677; 6,636,258; 7,145,519; 7,161,616; 7,230, 640; 7,248,283; 7,295,229; 7,301,466; 7,592,928; 7,881, 496; 7,720,580; 7,038,577; 6,882,287; 5,929,786 and/or 5,786,772, and/or U.S. Publication Nos. US-2014-0340510;

US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may utilize sensors, such as radar sensors or imaging radar sensors or lidar sensors or the like, to detect presence of and/or range to other vehicles and objects at the intersection. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controlling at least one function or feature of the vehicle (such as to provide autonomous driving control of the vehicle) responsive to processing of the data captured by the radar sensors.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for testing a vehicular control system, the method comprising:

receiving, at a simulator, a discrete diagram comprising (i) a plurality of nodes and (ii) a plurality of edges, wherein each node of the plurality of nodes represents a task of the vehicular control system to be simulated, and wherein each edge of the plurality of edges connects two respective nodes of the plurality of nodes and represents data transfer between the two respective nodes;

receiving, at the simulator, a requested determinism level selected at a user device from a plurality of determinism levels;

selecting, from a plurality of execution policies, an execution policy based on (i) the simulator, (ii) the discrete diagram (iii) and the received requested determinism level; and simulating, by the simulator, each task represented by the plurality of nodes using the selected execution policy to simulate operation of the vehicular control system on a vehicle.

2. The method of claim 1, further comprising receiving, at the simulator, an execution model selected at the user device, and wherein selecting the execution policy is further based on the execution model selection.

3. The method of claim 2, wherein the execution model selection comprises one selected from the group consisting of (i) a default model, (ii) a snapshot model, (iii) an isolated write model, (iv) a read/process/write model and (iv) a time-informed model.

4. The method of claim 1, wherein the received requested determinism level comprises one selected from the group consisting of (i) none, (ii) flow and (iii) fast.

5. The method of claim 1, further comprising receiving, at the simulator and from the user device, a requested causality selection, wherein the requested causality selection comprises of one selected from the group consisting of (i) strong causality, (ii) weak causality and (iii) semi-weak causality.

6. The method of claim 1, wherein simulating each task represented by the plurality of nodes comprises delaying at least one data transfer between a pair of nodes of the plurality of nodes.

7. The method of claim 6, further comprising determining the pair of nodes based on heuristics.

8. The method of claim 6, further comprising determining the pair of nodes based on a requested edge selection received at the simulator.

9. The method of claim 8, further comprising receiving the requested edge selection in response to a user interaction with a graphical user interface.

10. The method of claim 6, wherein the at least one data transfer comprises a minimal number of data transfers that satisfies the requested determinism level.

11. The method of claim 1, wherein the user device executes a graphical user interface, and wherein the requested determinism level is received responsive to a user interaction with the graphical user interface.

12. The method of claim 1, wherein the discrete diagram indicates a frequency that each executes at.

13. The method of claim 1, further comprising determining a clique cover for the discrete diagram, and wherein simulating each task represented by the plurality of nodes is based on the determined clique cover.

14. A method for testing a vehicular control system, the method comprising:

receiving, at a simulator, a discrete diagram comprising (i) a plurality of nodes and (ii) a plurality of edges, wherein each node of the plurality of nodes represents a task of the vehicular control system to be simulated, and wherein each edge of the plurality of edges connects two respective nodes of the plurality of nodes and represents data transfer between the two respective nodes;

receiving, at the simulator, a requested determinism level selected at a user device from a plurality of determinism levels, wherein the received requested determinism level comprises one selected from the group consisting of (i) none, (ii) flow and (iii) fast;

receiving, at the simulator, an execution model selected at the user device;

selecting, from a plurality of execution policies, an execution policy based on (i) the simulator, (ii) the discrete diagram, (iii) the received requested determinism level and (iv) the execution model; and simulating, by the simulator, each task represented by the plurality of nodes using the selected execution policy to simulate operation of the vehicular control system on a vehicle.

15. The method of claim 14, wherein the execution model selection comprises one selected from the group consisting of (i) a default model, (ii) a snapshot model, (iii) an isolated write model, (iv) a read/process/write model and (iv) a time-informed model.

16. The method of claim 14, further comprising receiving, at the simulator and from the user device, a requested causality selection, wherein the requested causality selection comprises of one selected from the group consisting of (i) strong causality, (ii) weak causality and (iii) semi-weak causality.

17. The method of claim 14, wherein simulating each task represented by the plurality of nodes comprises delaying at least one data transfer between a pair of nodes of the plurality of nodes.

18. A method for testing a vehicular control system, the method comprising:

receiving, at a simulator, a discrete diagram comprising (i) a plurality of nodes and (ii) a plurality of edges, wherein each node of the plurality of nodes represents a task of the vehicular control system to be simulated, and wherein each edge of the plurality of edges connects two respective nodes of the plurality of nodes and represents data transfer between the two respective nodes;

receiving, at the simulator, a requested determinism level selected at a user device from a plurality of determinism levels, wherein the user device executes a graphical user interface, and wherein the requested determinism level is received responsive to a user interaction with the graphical user interface;

selecting, from a plurality of execution policies, an execution policy based on (i) the simulator, (ii) the discrete diagram (iii) and the received requested determinism level; and simulating, by the simulator, each task represented by the plurality of nodes using the selected execution policy to simulate operation of the vehicular control system on a vehicle, wherein simulating each task represented by the plurality of nodes comprises delaying at least one data transfer between a pair of nodes of the plurality of nodes.

19. The method of claim 18, further comprising determining the pair of nodes based on heuristics.

20. The method of claim 18, further comprising determining the pair of nodes based on a requested edge selection received at the simulator.

21. The method of claim 20, further comprising receiving the requested edge selection in response to a second user interaction with the graphical user interface.

22. The method of claim 18, wherein the at least one data transfer comprises a minimal number of data transfers that satisfies the requested determinism level.

\* \* \* \* \*

UNITED STATES PATENT AND TRADEMARK OFFICE
CERTIFICATE OF CORRECTION

| | | |
|---|---|---|
| PATENT NO. | : 12,447,982 B2 | Page 1 of 1 |
| APPLICATION NO. | : 18/337540 | |
| DATED | : October 21, 2025 | |
| INVENTOR(S) | : Mohamed Babaali | |

It is certified that error appears in the above-identified patent and that said Letters Patent is hereby corrected as shown below:

In the Specification

<u>Column 12</u>
Line 64, "5,550,677; 6,636,258;" should be --5,550,677; 5,670,935; 6,636,258;--

Signed and Sealed this
Eighteenth Day of November, 2025

John A. Squires
*Director of the United States Patent and Trademark Office*